US009723432B2

(12) United States Patent
Fujii et al.

(10) Patent No.: US 9,723,432 B2
(45) Date of Patent: Aug. 1, 2017

(54) INFORMATION PROVIDING SYSTEM, INFORMATION TERMINAL AND INFORMATION PROVIDING SERVER, TO UPDATE DELIVERY INFORMATION BASED ON BEHAVIORAL TRENDS OF PLURAL TERMINALS

(71) Applicants: Tatsuya Fujii, Kanagawa (JP); Tsutomu Kawase, Kanagawa (JP); Yoshiaki Nishizaki, Kanagawa (JP); Yuichiro Ueda, Kanagawa (JP)

(72) Inventors: Tatsuya Fujii, Kanagawa (JP); Tsutomu Kawase, Kanagawa (JP); Yoshiaki Nishizaki, Kanagawa (JP); Yuichiro Ueda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/652,538

(22) PCT Filed: Dec. 26, 2013

(86) PCT No.: PCT/JP2013/085336
§ 371 (c)(1),
(2) Date: Jun. 16, 2015

(87) PCT Pub. No.: WO2014/104404
PCT Pub. Date: Jul. 3, 2014

(65) Prior Publication Data
US 2015/0334514 A1    Nov. 19, 2015

(30) Foreign Application Priority Data

Dec. 28, 2012  (JP) ................................ 2012-288464

(51) Int. Cl.
*H04W 4/00* (2009.01)
*H04W 4/02* (2009.01)
(Continued)

(52) U.S. Cl.
CPC ............ *H04W 4/008* (2013.01); *G06Q 10/10* (2013.01); *G06Q 30/0251* (2013.01);
(Continued)

(58) Field of Classification Search
CPC ..... H04W 4/008; H04W 4/021; H04W 92/18; H04W 88/04; H04H 20/61; G06Q 10/10;
(Continued)

(56) References Cited

U.S. PATENT DOCUMENTS 7,240,837 B2    7/2007  Fujii
7,259,677 B2    8/2007  Fujii
(Continued)

FOREIGN PATENT DOCUMENTS

CN         1522414 A      8/2004
JP       2002-228481      8/2002
(Continued)

OTHER PUBLICATIONS

European search report dated Nov. 9, 2015 in corresponding European Patent Application No. 13867899.0.
(Continued)

*Primary Examiner* — Alejandro Rivero
(74) *Attorney, Agent, or Firm* — Cooper & Dunham LLP

(57) ABSTRACT

An information providing system provides delivery information using identification information of an object equipped with a wireless communication function. The information providing system includes a registering unit that registers in advance first link information linking the identification information of the object to the delivery information; a generating unit that generates second link information linking the identification information of the object to delivery information different from the delivery information of the first link information, based on the identification information of the object and identification information of a plurality of information terminals, acquired by communication with the information terminals, which can communicate
(Continued)

with the object; and an information providing unit that delivers the delivery information linked by the second link information.

10 Claims, 18 Drawing Sheets

(51) Int. Cl.
    *H04H 20/61*     (2008.01)
    *G06Q 10/10*     (2012.01)
    *G06Q 30/02*     (2012.01)
    *H04W 92/18*     (2009.01)
    *H04W 88/04*     (2009.01)

(52) U.S. Cl.
    CPC ............ *H04H 20/61* (2013.01); *H04W 4/021* (2013.01); *H04W 88/04* (2013.01); *H04W 92/18* (2013.01)

(58) Field of Classification Search
    CPC .... G06Q 30/02; G06Q 30/0261; G06Q 20/20; G06Q 30/0224; G06Q 30/0251; G06Q 30/0268
    See application file for complete search history.

(56) References Cited

U.S. PATENT DOCUMENTS

| | | | |
|---|---|---|---|
| 7,374,089 B2 | 5/2008 | Fujii | |
| 7,580,675 B2 | 8/2009 | Kuriki et al. | |
| 7,859,991 B2 | 12/2010 | Fujii | |
| 8,228,196 B1 | 7/2012 | Thornton | |
| 8,369,781 B2 | 2/2013 | Fujii | |
| 2002/0120516 A1 | 8/2002 | Sakagami et al. | |
| 2004/0243519 A1* | 12/2004 | Perttila | G06Q 20/20 705/75 |
| 2006/0071778 A1 | 4/2006 | Vesikivi et al. | |
| 2006/0163351 A1 | 7/2006 | Kuriki et al. | |
| 2006/0200463 A1 | 9/2006 | Dettinger et al. | |
| 2012/0066062 A1* | 3/2012 | Yoder | G06Q 30/0253 705/14.51 |
| 2012/0265616 A1 | 10/2012 | Cao et al. | |

FOREIGN PATENT DOCUMENTS

| | | |
|---|---|---|
| JP | 3726748 | 12/2005 |
| JP | 2010-128815 | 6/2010 |

OTHER PUBLICATIONS

Jan. 20, 2016 official action in connection with Singapore Patent Application No. 11201504634Y.
International Search Report Issued on Apr. 15, 2014 in PCT/JP2013/085336 filed on Dec. 26, 2013.
Mar. 13, 2017 Chinese official action (and English translation thereof) in connection with corresponding Chinese patent application No. 201380071396.2.

* cited by examiner

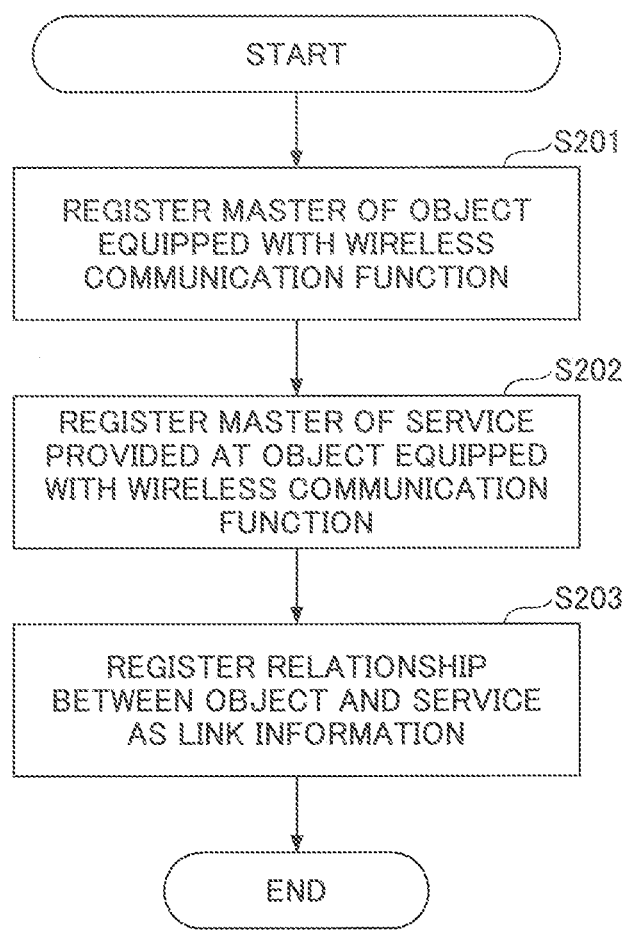

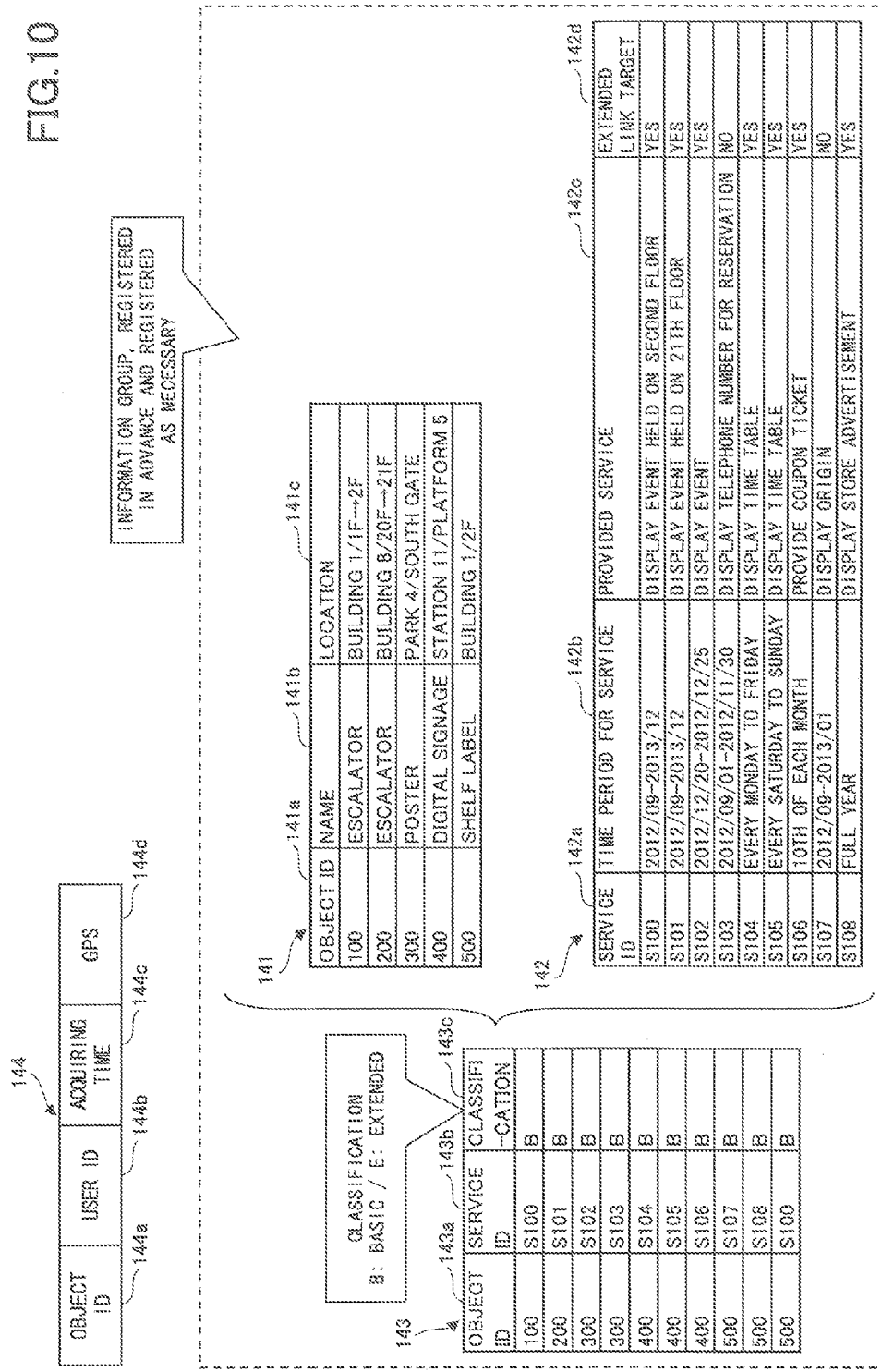

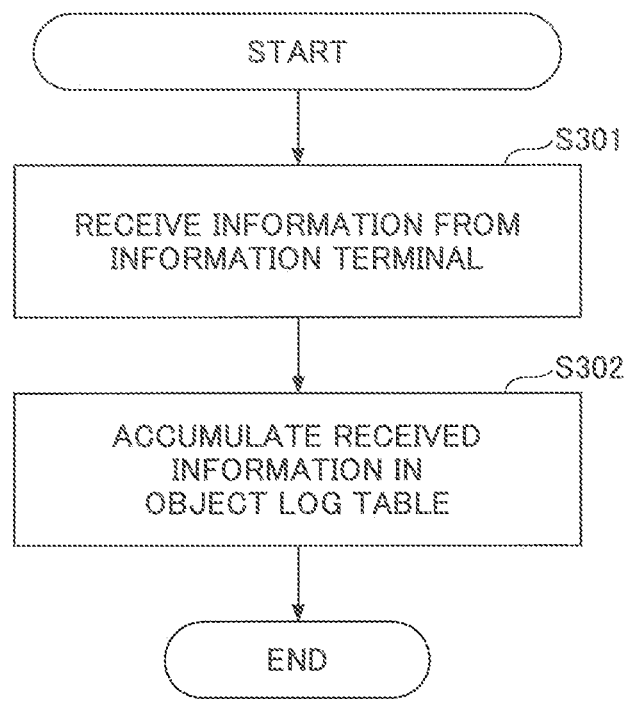

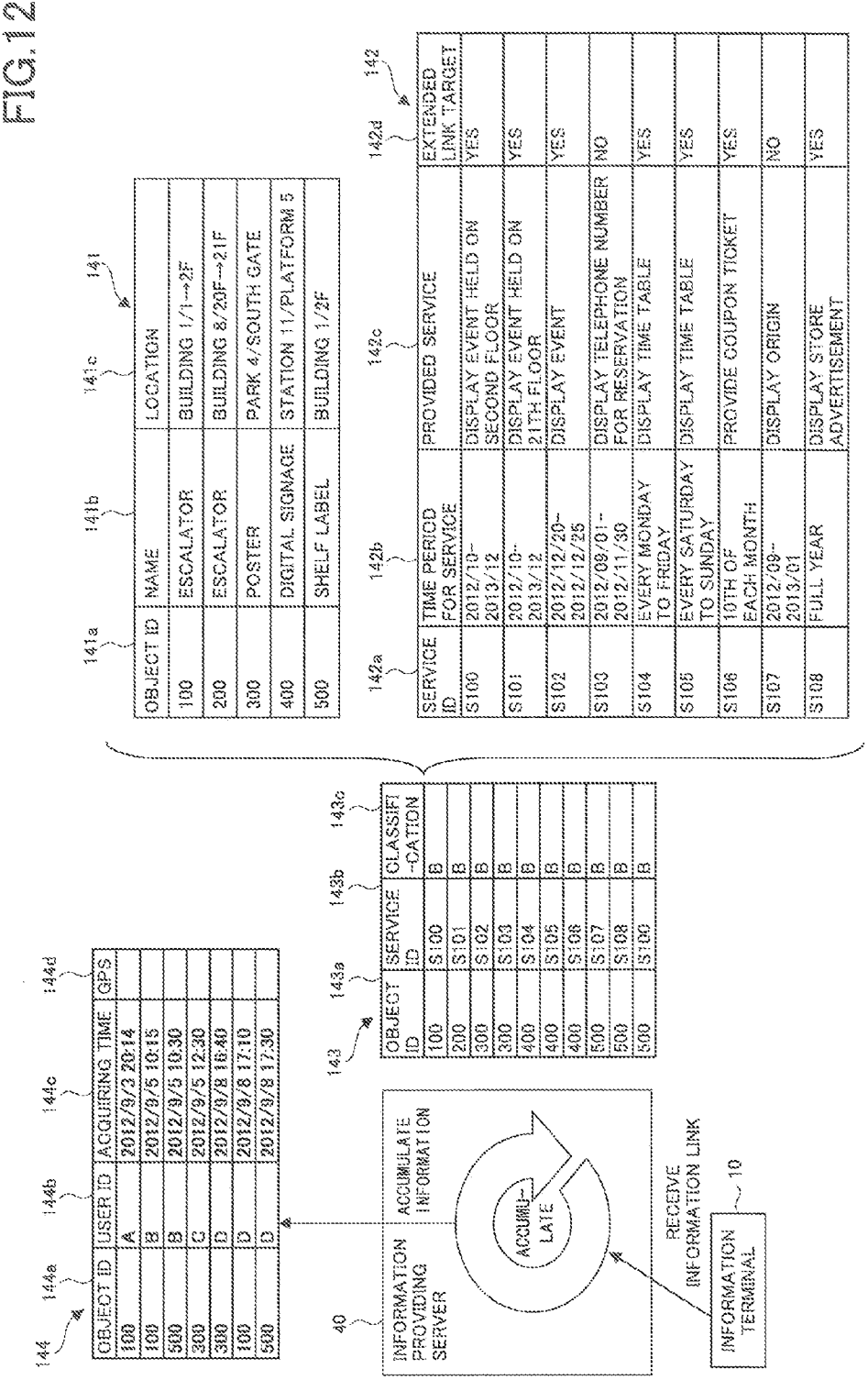

INFORMATION PROVIDING SYSTEM, INFORMATION TERMINAL AND INFORMATION PROVIDING SERVER, TO UPDATE DELIVERY INFORMATION BASED ON BEHAVIORAL TRENDS OF PLURAL TERMINALS

TECHNICAL FIELD

This invention relates to an information providing system, an information terminal and an information providing server.

BACKGROUND ART

There have been information providing services for providing to information terminals, which users carry while staying out, delivery information valuable for each user. These services specify the delivery information, which meets preference of the user, according to the user's behavior, and deliver the information. For example, patent document 1 discloses an information providing server, which, on receiving an information request from a user's information terminal, obtains location information, where the user's information terminal exists, based on user's position information included in the information request. Moreover, the information providing server obtains information on characteristics of each user based on attribute information included in the information request. Furthermore, the information providing server obtains a staying time and a frequency of visit of the user's information terminal based on an action log database.

The information providing server disclosed in the patent document 1 identifies a delivery rule, which conforms to the location information, the information on characteristics for each user, the user's staying time and the frequency of visit, obtained as above. The information providing server generates delivery information based on the delivery rule, and delivers the generated information to the user's information terminal.

CITATION LIST

Patent Literature

Patent document 1: Japanese Patent No. 3726748.

DISCLOSURE OF INVENTION

Problems to be Solved by the Invention

However, in the related art including the patent document 1, the delivery information is specified according to the characteristics of each user so as to be useful to the user. Accordingly, the attribute information of the user needs to be obtained and registered in advance. Moreover, the delivery information is specified taking account of a traffic line, which represents the user's daily behavior, and requires the position information of the user. The position information is obtained by using an infrastructure, such as GPS (Global Positioning System), which provides position information. The information obtained as above is linked to the delivery information delivered to the user, and the delivery information appropriate for the traffic line and for the attributes of each user is specified. The specified delivery information is delivered to the user as an information providing service.

The information providing service of the related art delivers information, which meets the purpose or the preference of each user. However, in the related art, behaviors of plural users or plural information terminals are not accumulated and analyzed, taking account of the traffic lines of the plural users or the plural information terminals. Accordingly, the information providing service of the related art does not provide delivery information, which would be specified so as to flexibly conform to an overall trend of the analyzed plural users or plural information terminals.

In view of the above subject matter, it is a general object of at least one embodiment of the present invention to provide an information providing system and an information providing server that specify delivery information according to traffic lines of plural users and provide the specified delivery information to a user's terminal, and to provide a terminal that receives the delivery information.

Means to Solve the Problems

In order to solve the above problem, according to an aspect of the present invention, an information providing system provides delivery information using identification information of an object equipped with a wireless communication function. The information providing system includes a registering unit that registers in advance first link information which links the identification information of the object equipped with the wireless communication function to the delivery information; a generating unit that generates second link information which links the identification information of the object equipped with the wireless communication function to delivery information different from the delivery information linked by the first link information, based on, at least, the identification information of the object equipped with the wireless communication function and identification information of a plurality of information terminals, acquired by communication with the plurality of information terminals, which can communicate with the object equipped with the wireless communication function; and an information providing unit that delivers the delivery information linked by the second link information generated by the generating unit.

According to another aspect of the present invention, an information terminal communicates with an object equipped with a wireless communication function. Using a table in which first link information is registered in advance, the first link information linking identification information of the object equipped with the wireless communication function to delivery information, based on, at least, the identification information of the object equipped with the wireless communication function and identification information of a plurality of information terminals, acquired by communication with the plurality of information terminals, which can communicate with the object equipped with the wireless communication function, second link information is generated, the second link information linking the identification information of the object equipped with the wireless communication function to delivery information different from the delivery information linked by the first link information. The information terminal includes a display controlling unit that causes the delivery information linked by the generated second link information to be delivered.

According to yet another aspect of the present invention, an information providing server provides delivery information using identification information of an object equipped with a wireless communication function. The information providing server includes a registering unit that registers in advance first link information which links the identification information of the object equipped with the wireless communication function to the delivery information; a generating unit that generates second link information which links the identification information of the object equipped with the wireless communication function to delivery information different from the delivery information linked by the first link information, based at least on the identification information of the object equipped with the wireless communication function and identification information of a plurality of information terminals, acquired by communication with the plurality of information terminals, which can communicate with the object equipped with the wireless communication function; and an information providing unit that delivers the delivery information linked by the second link information generated by the generating unit.

Effects of the Present Invention

According to the present invention, delivery information according to traffic lines of plural users or plural information terminals is specified and the specified information can be provided.

BRIEF DESCRIPTION OF DRAWINGS

FIG. 9 is a flowchart illustrating an example of a registration process according to the present exemplary embodiment;

FIG. 10 is a diagram illustrating an example of the registration process according to the present exemplary embodiment;

FIG. 11 is a flowchart illustrating an example of a process of accumulating an object log according to the present exemplary embodiment;

FIG. 12 is a diagram illustrating an example of the process of accumulating the object log according to the present exemplary embodiment;

BEST MODE FOR CARRYING OUT THE INVENTION

Figure 1:
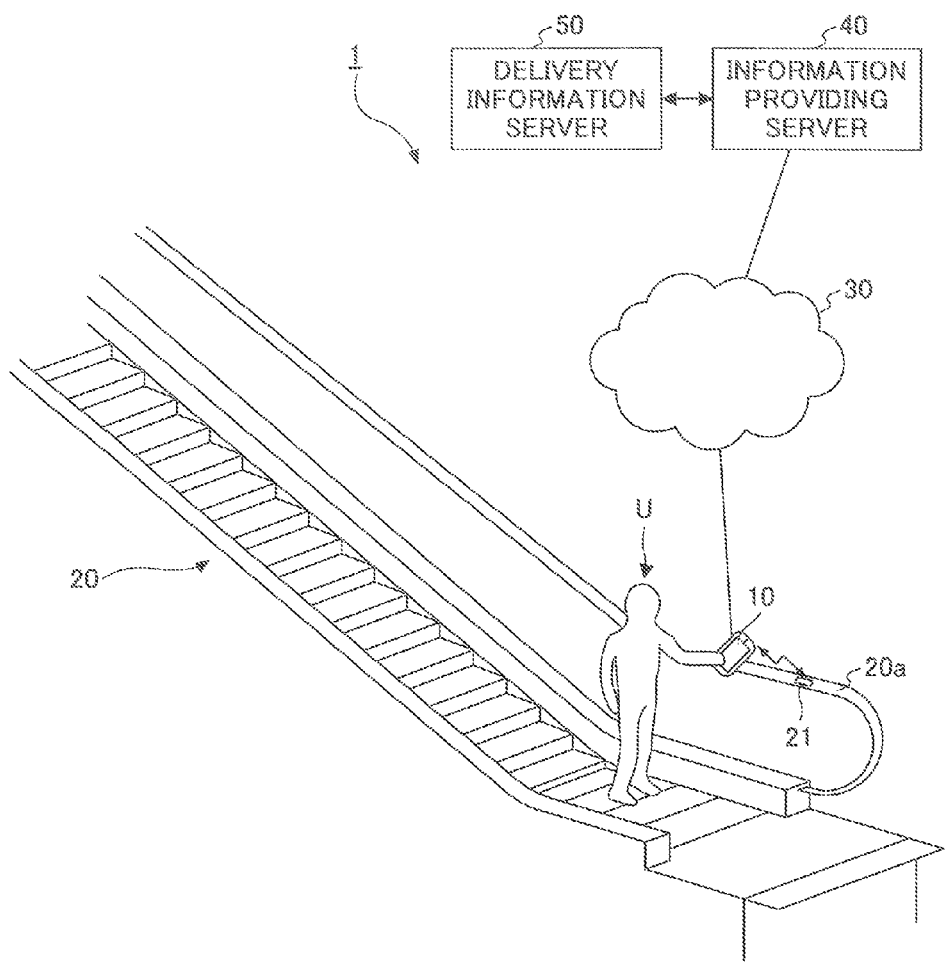
FIG. 1 is a diagram illustrating an example of a configuration of an information providing system according to a present exemplary embodiment.

In the following, a preferred exemplary embodiment according to the present invention will be described with reference to the accompanying drawings. Meanwhile, the same reference numeral is assigned to the members which have substantially same function or configuration, and duplicate explanation is omitted.

In the information delivery service of the related art, delivery information is specified taking account of a traffic line of each user, and the specified information is delivered to an information terminal which the user carries while staying out. In order to specify the delivery information so as to meet the purpose or the preference of the user, attribute information, position information, and the like are required.

[Configuration of System]

On the other hand, an information providing system according to the present exemplary embodiment, which will be described in the following, taking account of traffic lines of plural users who access a predetermined access point, analyzes behaviors of the plural users in a predetermined region around the access point. The information providing system according to the present exemplary embodiment, based on results of the analysis, specifies delivery information, which conforms flexibly to an overall trend of the behaviors of the plural users, and provides the delivery information.

An example of a configuration of the information providing system 1 according to the present exemplary embodiment will be explained with reference to a diagram illustrated in FIG. 1. As shown in FIG. 1, a wireless tag 21 of RFID (Radio Frequency IDentification), NFC (Near Field Communication) or the like, is embedded in a belt 20a of an escalator 20.

A user "U", who takes the escalator 20, passes an information terminal 10 over the belt 20a of the escalator 20. The information terminal 10 wirelessly communicates with the wireless tag 21 embedded in the belt 20a of the escalator 20, and reads ID (identification) information of the belt 20a of the escalator 20. The information terminal 10 is connected to an information providing server 40 via a network 30. The information terminal 10 transmits a current time given by the information terminal 10, an e-mail address of the information terminal 10, position information from GPS, and the like, in addition to the ID information of the belt 20a of the escalator 20 to the information providing server 40. The ID information of the belt 20a of the escalator 20, the current time, the e-mail address of the terminal, and the position information from the GPS are examples of log information.

The belt 20a of the escalator 20 is an example of an object equipped with a wireless communication function, and the ID information of the belt 20a of the escalator 20 is an example of identification information of the object equipped with the wireless communication function. The wireless communication function of the object equipped with the wireless communication function may be an active tag, in which a battery is embedded. The active tag is a kind of the RFID tag, which transmits and receives an electric wave by power from the battery, and can communicate with a reader/writer several tens of meters away from the object.

The object, mentioned here, may be a body of an electronic apparatus, such as a microwave oven, provided that the object is equipped with the wireless communication function. Moreover, the object may be a paper medium, such as an advertisement, a poster, or other various media, provided that a tag having the wireless communication function can be attached to the medium. The wireless communication includes communication using a sound wave. The object equipped with the communication function using a sound wave may include a microphone and/or a speaker. A request from the user or the information terminal may be a voice or a sound, and the response to the request may be a sound.

The belt 20a of the escalator 20, in which the wireless tag 21 is embedded, is an example of the object equipped with the wireless communication function. The ID information of the belt 20a of the escalator 20 is an example of identification information of the object equipped with the wireless communication function. Moreover, as described later, plural wireless tags (wireless communication functions) may be attached to the object.

Figure 2:
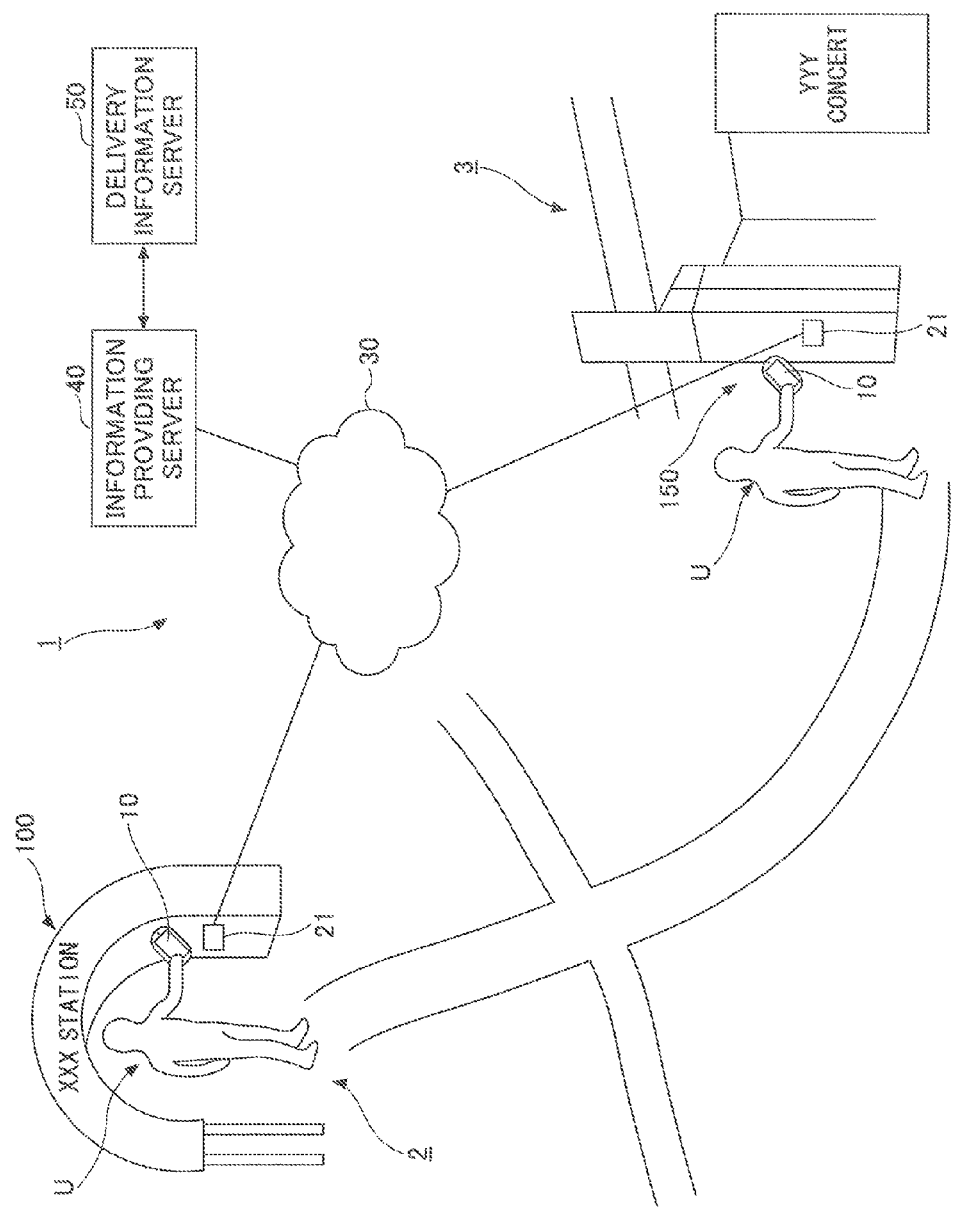
FIG. 2 is a diagram illustrating another example of the configuration of the information providing system according to the present exemplary embodiment.

With reference to FIG. 2, another example of the configuration of the information providing system 1 according to the present exemplary embodiment will be described. A user "U", who is at a gate of a station 2, passes an information terminal 10 on an arch-like member 100. The information terminal 10 wirelessly communicates with a wireless tag 21 embedded in the arch-like member 100, and reads ID (identification) information of the arch-like member 100 of the station 2. The information terminal 10 transmits the read ID information of the arch-like member 100 of the station 2, a current time, and the like to the information providing server 40.

The user "U" walks from the station 2 to a concert venue 3, and passes the information terminal 10 on a gate pier 150 of the concert venue 3. The information terminal 10 wirelessly communicates with a wireless tag 21 embedded in the gate pier 150 of the concert venue 3, and reads ID information of the gate pier 150 of the concert venue 3. The information terminal 10 transmits the read ID information of the gate pier 150 of the concert venue 3, a current time, and the like to the information providing server 40. The ID information of the arch-like member 100 of the station 2, the ID information of the gate pier 150 of the concert venue 3, and the current time are examples of the log information.

The arch-like member 100, the concert venue 3 and the gate pier 150 are examples of the object equipped with the wireless communication function. Moreover, the ID information of the arch-like member 100 of the station 2 and the ID information of the gate pier 150 of the concert venue 3 are examples of the identification information of the object equipped with the wireless communication function. In the above example, the ID information of the station 2 or the ID information of the gate pier 150 is transmitted to the information providing server 40. If the wireless tag 21 embedded in the arch like member 100 or the gate pier 150 is connected to the information providing server, the wireless tag 21 may transmits wiredly or wirelessly the ID information to the information providing server 40 with the information of the information terminal 10, acquired in the wireless communication with the information terminal 10.

Furthermore, with reference to FIG. 3, yet another example of the configuration of the information providing system 1 according to the present exemplary embodiment will be described. A user "U0", who uses an escalator 200 moving from a first basement level (B1F) to a ground floor level (1F), passes an information terminal 10a on a belt 200a of the escalator 200. The information terminal 10a wirelessly communicates with a wireless tag 210a embedded in the belt 200a of the escalator 200, and reads ID information of the belt 200a of the escalator 200. The information terminal 10a transmits the read ID information of the belt 200a of the escalator 200, a current time and the like to the information providing server 40.

A user "U1" passes an information terminal 10b on a belt 200b of the escalator 200. The information terminal 10b wirelessly communicates with a wireless tag 210b embedded in the belt 200b of the escalator 200, and reads ID information of the belt 200b of the escalator 200. The information terminal 10b transmits the read ID information of the belt 200b of the escalator 200, a current time and the like, to the information providing server 40.

A user "U2" passes an information terminal 10c on a belt 300a of an escalator 300. The information terminal 10c wirelessly communicates with a wireless tag 310a embedded in the belt 300a of the escalator 300, and reads ID information of the belt 300a of the escalator 300. The information terminal 10c transmits the read ID information of the belt 300a of the escalator 300, and the like, to the information providing server 40.

A user "U3" passes an information terminal 10d on a belt 300b of the escalator 300. The information terminal 10d wirelessly communicates with a wireless tag 310b embedded in the belt 300b of the escalator 300, and reads ID information of the belt 300b of the escalator 300. The information terminal 10d transmits the read ID information of the belt 300b of the escalator 300, and the like, to the information providing server 40.

The belts 200a, 200b of the escalator 200, the belts 300a, 300b of the escalator 300, in which the wireless tag 210a, 210b, 310a, and 310b, respectively, are examples of the object equipped with the wireless communication function. The ID information of the belt 200a, 200b of the escalator 200, and the ID information of the belts 300a, 300b of the escalator 300, are examples of the identification information of the object equipped with the wireless communication function.

The information providing server 40 accumulates the log information transmitted, as above, from the information terminals 10 of the plural users "U0" to "U3". The information providing server 40, based on the accumulated log information, analyses traffic lines of the plural users "U0" to "U3" who have accessed the predetermined wireless tags. The information providing server 40, based on results of the analysis, specifies delivery information which conforms to an overall trend of the behaviors of the plural users, and displays the specified delivery information on at least one of the information terminals 10a to 10d, or displays the delivery information on signage in the neighborhood.

Figure 3:
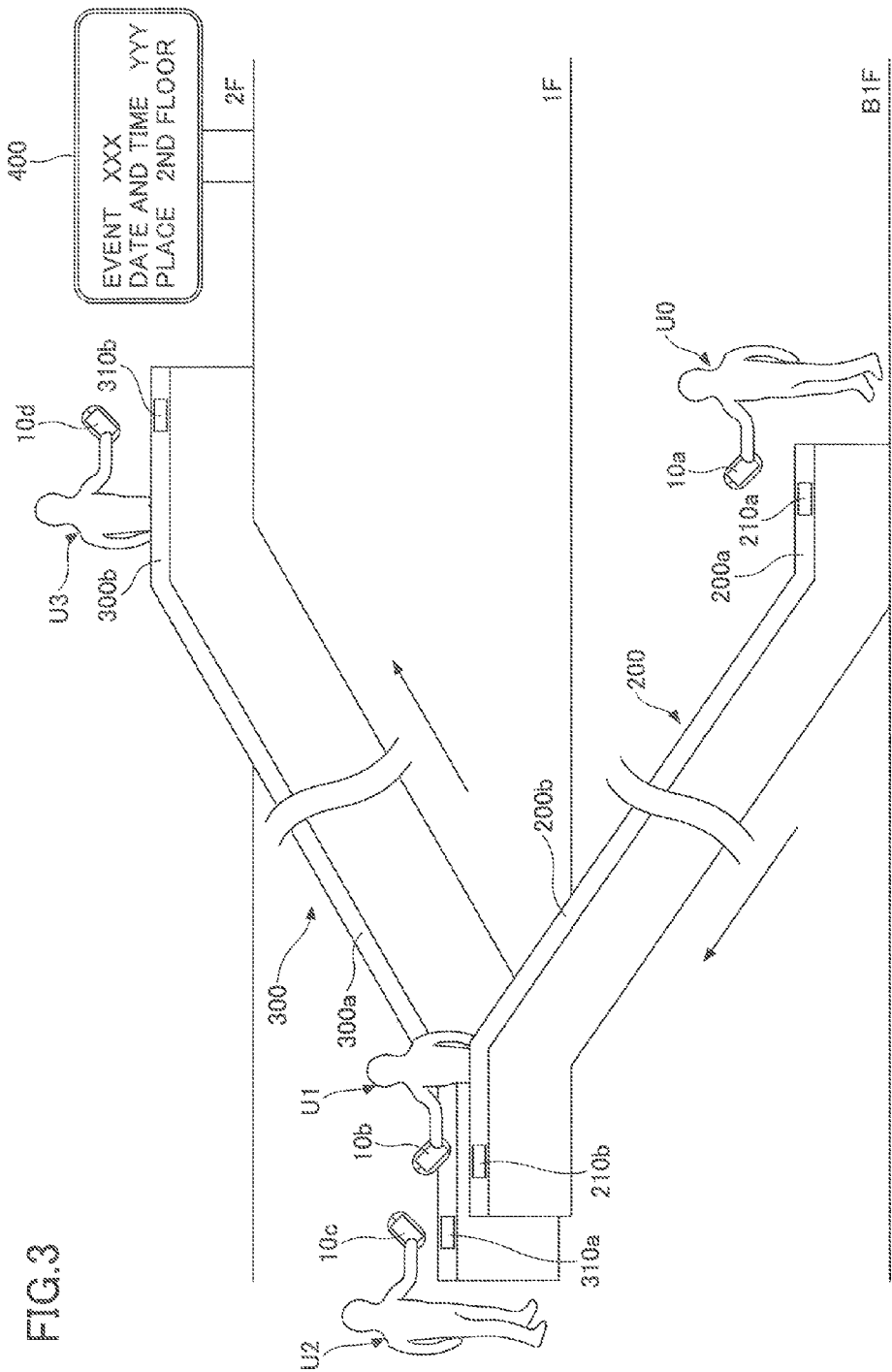
FIG. 3 is a diagram illustrating yet another example of the configuration of the information providing system according to the present exemplary embodiment.

For example, to the users "U2" and "U3", who pass the information terminals 10c, 10d on the belts 300a, 300b of the escalator 300, as shown in FIG. 3, delivery information is delivered. The delivery information is specified based on a result of analysis of the traffic lines of the users "U2" and "U3", who move to the second floor level (2F). The delivery information conforms to the overall trend of behaviors of plural users taking the escalator 300, and includes, for example, information on an event held on the second floor in the same building. The event information may be displayed on the information terminals 10c, 10d of the users "U2" and "U3", respectively, and may be displayed on signage 400 placed in the neighborhood of the escalator 300 of the second floor. The delivery information may be displayed both on the information terminals 10c, 10d and the signage 400. Accordingly, the users "U2", "U3" easily obtain useful information, which conforms to the overall trend of the plural users' behaviors.

The traffic lines of the users "U0" to "U3" may be analyzed, as shown in FIG. 3. The delivery information is specified based on the result of the analysis, so as to conform to an overall trend of behavior of the user group (the users "U0" to "U3") entering the building and taking the escalator 200, or the escalator 300, and provided to the users "U0" to "U3". The delivery information specified as above is, for example, information on a specialty products fair.

Moreover, a delivery information server 50 is connected to the information providing server 40. From the delivery information server 50, one piece or plural pieces of delivery information, which can be provided to users, are supplied. The delivery information, which can be provided to the users, includes an advertisement displaying an event, and an application program executable in the information terminal 10. Furthermore, position information from the GPS is not indispensable, but it is preferable if the position information is included in the information transmitted from the information terminal 10 to the information providing server 40.

The information terminal 10 has a function of an inputting and outputting device and a function of a communicating device. The information terminal 10 may be a smartphone, a personal digital assistant (PDA), a mobile phone, a tablet terminal, a terminal of a personal handy-phone system (PHS), or the like. In the following, delivery information transmitted to plural information terminals may be called service provided to plural information terminals.

In the information providing system 1 according to the present exemplary embodiment, link information, which connects identification information of an object equipped with the wireless communication function to delivery information, is managed in the information providing server 40. The information providing server 40 may offer the link information to the delivery information server 50, which supplies the delivery information.

DEFINITION OF TERMS

The terms used in the explanation for the information providing system 1 according to the present exemplary embodiment are defined as follows.

(1) Object Log

Object log is data in which information collected from the object equipped with the wireless communication function via the information terminal 10 is accumulated. The object log includes, for example, object ID (identification information) 144a, user ID 144b, an acquired time 144c, and GPS position information 144d, as shown in FIG. 12. The object ID 144a is identification information of the object equipped with the wireless communication function collected from the object equipped with the wireless communication function via the information terminal 10. The user ID 144b is identification information of the user, who carries the information terminal 10, and may be, for example, an e-mail address or the like. The user ID 144b is an example of the identification information of the information terminal 10.

The acquired time 144c is a time acquired in the information terminal 10 when the object log is generated. The GPS position information 144d is position information of the information terminal 10. The user ID 144b, the acquired time 144c, and the GPS position information 144d are examples of attribute information of the information terminal 10.

In the object log, a data form is not changed, i.e. the information is held as it was collected from the object equipped with the wireless communication function via the information terminal 10. Even if the storing form has been converted in order to facilitate a secondary use of the information in the object log, when the collected information itself is not changed, the information, the storing form of which has been converted, is included in the collected information and treated as the object log.

(2) Object Master

Object master is information on an object equipped with the wireless communication function to be managed. The object master is assumed to be registered in advance. The object master includes, as shown in FIG. 10, for example, an object ID 141a, a name 141b, and location information 141c. The object ID 141a is identification information of the object equipped with the wireless communication function. The name 141b is a name of the object equipped with the wireless communication function. The location information 141c is a position where the object equipped with the wireless communication function is placed. For example, the object equipped with the wireless communication function identified by the object ID "100", as shown in FIG. 10, represents the escalator with a wireless tag moving from the ground floor level (1F) to the second floor level (2F) of the building 1. Moreover, in the case that plural wireless tags are attached to one object, sequential serial numbers 1, 2, . . . may be assigned as a piece of location information of each wireless tag. Different object ID may be assigned to each of the wireless tags.

(3) Service Master

Service master is information on a service that can be provided in the information providing system 1 according to the present exemplary embodiment. The service master is assumed to be registered in advance. The service master includes, as shown in FIG. 10, for example, a service ID 142a, a service time 142b, a providing service 142c, and an extended link target 142d. The service ID 142a is identification information of the service. The service time 142b is the time when the service is provided. The providing service 142c is a content of the service to be provided, i.e. the delivery information. In the service master, the content of the provided service at each location is assumed to be determined in advance. A kind of the provided service 142c is, for example, supplying an application program executable at each information terminal, advertising by displaying event information on a display device, or the like. The extended link target 142d is a flag indicating whether the object is a target to which an extended link is generated or not, as will be explained later. When the extended link target 142d is "no", an extended link is not generated. The service master can determine, in advance, whether the object is a target to which an extended link is generated or not.

(4) Link Information

Link information indicates a relationship between information managed at the object master and information managed at the service master. The link information is used, according to the object log transmitted from the information terminal 10, as link information in providing a service to the information terminal. That is, the service connected to the object log according to the link information is provided to the information terminal 10.

The link information has two kinds of information, i.e. a basic link and an extended link. The basic link is link information prepared and registered in advance by an administrator. The extended link is link information derived by the analysis of the object log, and represents a causal relationship for changing according to a status of acquiring the object log and according to analysis logic.

The link information includes, as shown in FIG. 10, for example, an object ID 143a, a service ID 143b, and a classification 143c. The object ID 143a and the service ID 143b are, respectively, the object ID 141a and the service ID 142a registered as the object master and the service master. The classification 143c indicates a kind of link information. When the classification 143c is "B", the link information is a basic link, registered in advance, and corresponding to the first link information. For example, the link connecting the object identified by the object ID 143a, "100", and by the service ID 143b, "S100", to the delivery information (also called "service" in the following) is registered in advance as a basic link. The basic link is information on a link between the object ID and the service ID, which have been expected to be closely related with each other, and is registered in the link information table 143 in advance.

On the other hand, when the classification 143c is "E", the link information indicates an extended link, and corresponds to second link information. The extended link is generated based on a result of analyzing the object log accumulated in the object log table 144, and analyzing an overall trend of the behavior of plural users. That is, the extended link is, when the object and the service are judged to be closely related with each other based on the result of analysis, registered in the link information table 143 as link information between the object ID and the service ID.

The extended link, generated as above, may be deleted, when the object and the service are judged to become irrelevant to each other. Moreover, the extended link, generated as above, may be changed to a basic link, when the object and the service are judged to be closely related with each other. The relationship between the object and the service are judged according to a change in the overall trend of the behavior of plural users, the status of delivery of the service linked based on the extended link, or the status of the accumulated object log. In this way, the basic link, of the link information registered in the link information table 143, is not updated generally, but the extended link is updated according to a change in trend of plural users' behavior, or the like.

[Functional Configuration of Information Providing Server]

Figure 4:
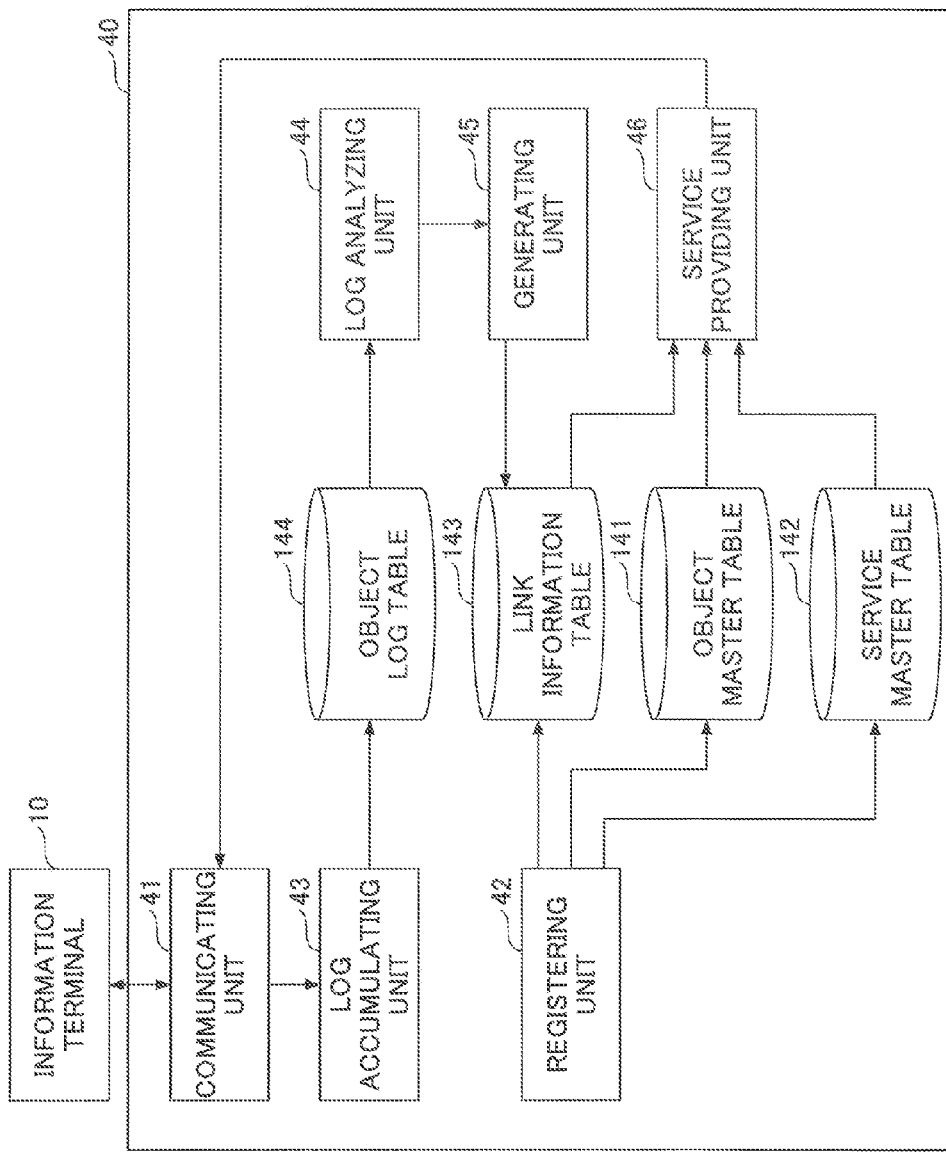
FIG. 4 is a diagram illustrating an example of a functional configuration of the information providing system according to the present exemplary embodiment.

Next, the functional configuration of the information providing server 40 according to the present exemplary embodiment will be described with reference to FIG. 4.

The information providing server 40 includes a communicating unit 41, a registering unit 42, a log accumulating unit 43, a log analyzing unit 44, a generating unit 45, and an information providing unit 46. The information providing server 40 further includes an object master table 141, a service master table 142, a link information table 143 and an object log table 144.

The communicating unit 41 sends information to and receives information from the information terminal 10. The registering unit 42 registers in advance a basic link which links the object ID with the service ID.

The log accumulating unit 43 accumulates information including the object ID and the user ID of the plural information terminals 10, transmitted from the plural information terminals 10, which enter a first region where communication with the object equipped with a wireless communication function is possible. The information collected by the log accumulating unit 43 is accumulated in the object log table 144 as an object log. The first region is, in FIG. 1, for example, a region where the information terminal 10 can wirelessly communicate with the wireless tag 21 on the belt 20a of the escalator 20. The range of the first region depends on a function of the object equipped with the wireless communication function as an access point. For example, the first region may be configured so that when the user only walks carrying the information terminal 10, the wireless communication between the information terminal 10 and the wireless tag 21 becomes possible, i.e. the information terminal 10 enters the first region. In this case, the first region is substantially larger than the case as shown in FIG. 1, in that the user contacts the information terminal with or brings the information terminal close to the object equipped with the wireless communication function.

The log analyzing unit 44 analyzes the object log accumulated in the object log table 144, and analyzes the trend of the behavior of the user of the information terminal 10, which wirelessly communicates with the object equipped with a wireless communication function. For the analysis of the trend of the user's behavior by the log analyzing unit 44, a known analyzing method may be employed.

The generating unit 45 generates an extended link based on the object log including the object ID transmitted from the information terminal 10 entering the first region and the user IDs of the plural information terminals. Specifically, the generating unit 45, based on the result of analysis of the object log, generates an extended link, which links the object ID with service ID different from the service ID linked by the basic link with the same object ID. Accordingly, to the information terminal 10, having transmitted the object ID, for which an extended link was generated, a service of the service ID linked by the basic link (delivery information A, for example) and a service of the service ID linked by the extended link (delivery information B, for example) are provided.

The information providing unit 46 delivers the service of the service ID linked by the basic link (delivery service A) to the information terminal 10 which wirelessly communicates with the object equipped with a wireless communication function identified by the object ID or to the signage located in the vicinity of the information terminal 10. Moreover, the information providing unit 46 delivers, in the case that the extended link has been generated, the service of the service ID linked by the extended link (delivery service B) to the information terminal 10 which wirelessly communicates with the object equipped with the wireless communication function identified by the object ID or to the signage located in the vicinity of the information terminal 10.

The object master table 141 registers object masters in advance. The service master table 142 registers service masters in advance. The link information table 143 stores link information between the object ID and the service ID. The object log table 144 accumulates object logs transmitted from the information terminal 10.

Figure 5:
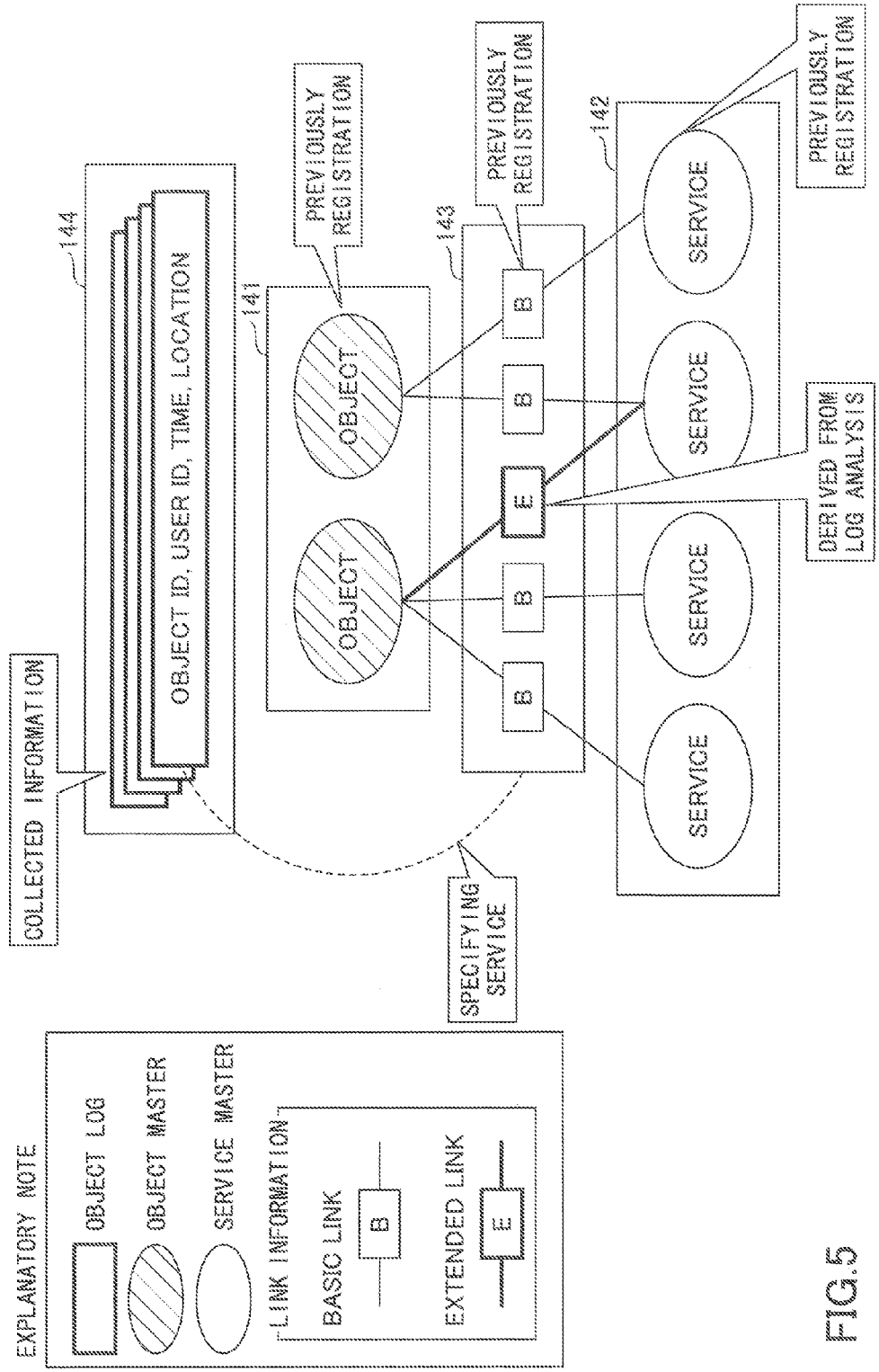
FIG. 5 is a diagram explaining information in the information providing system according to the present exemplary embodiment.

The information stored in the above-described tables, i.e. the object master, the service master, the link information and the object log, and relationships among them will be briefly explained with reference to FIG. 5. At first, the object master (denoted as "object" in FIG. 5) is preliminarily registered in the object master table 141. Moreover, the service master (denoted as "service" in FIG. 5) is preliminarily registered in the service master table 142. Two kinds of link information (denoted as "B" and "E" in FIG. 5) are registered in the link information table 143. Furthermore, the basic link "B" is preliminarily registered in the link information table 143. The extended link "E" may be, based on the log analysis, generated, deleted, or arbitrarily updated, during the system operations. For the log analysis, the object log accumulated in the object log table 144, during the system operations, is used. In the log analysis, behaviors of plural users are analyzed based on object ID, user ID, a current time, a location, and the like in the object log. In the case where a new relationship between object ID and service ID can be derived based on a result of the analysis, an extended link, which links the object ID with the service ID, is generated. Accordingly, the extended link "E" links the object ID with different service IDs from the service IDs, which is linked by the basic link "B" with the same object ID.

[Whole Sequence]

Figure 6:
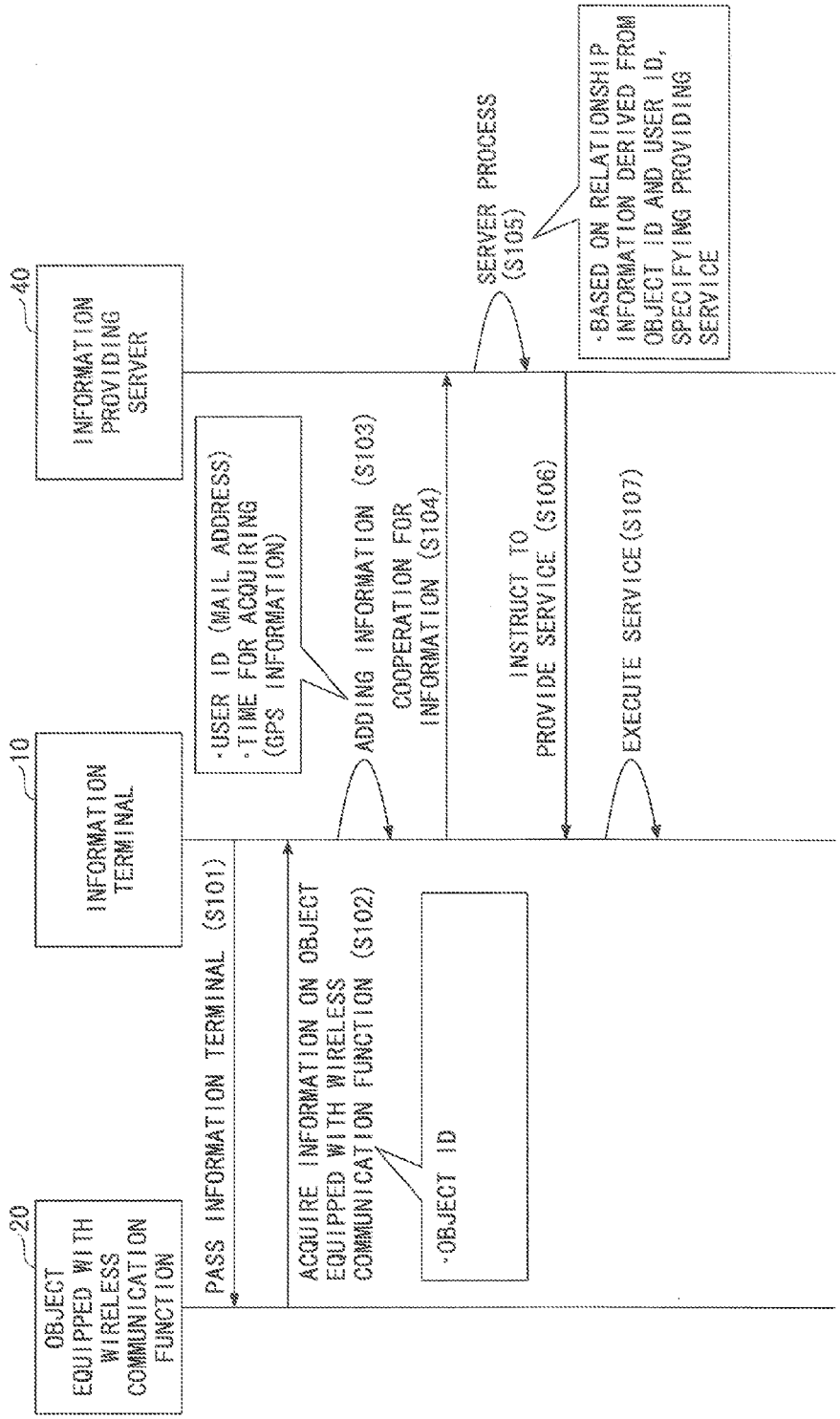
FIG. 6 is a sequence chart illustrating an example of an overall process according to the present exemplary embodiment.

Next, an example of whole sequence of the information providing system 1 according to the present exemplary embodiment will be explained referring to FIG. 6. At first, the information terminal 10 is passed on or close to the object equipped with a wireless communication function (step S101). The object is, for example, the wireless tag 210a in the belt 200a of the escalator 200, as shown in FIG. 3. The information terminal 10 wirelessly communicates with the wireless tag, and acquires information on the object equipped with the wireless communication function (step S102). In FIG. 6, the information terminal 10 obtains the object ID.

The information terminal 10 adds the user ID, an acquiring time, and GPS information to the object ID (step S103), and transmits the object ID, the user ID, the acquiring time, and the GPS information to the information providing server 40.

The information providing server 40 specifies a service based on relevant information derived from the received object ID and the received user ID (step S105). The information providing server 40 instructs to provide the specified service to the information terminal 10 (step S106). The information terminal 10 executes the instructed service (step S107).

According to the communication between the object equipped with the wireless communication function and the information providing server 40 via the plural information terminals 10, as above, the specified service required in cooperation can be provided to the information terminal 10.

[Flow of Process]

Figure 7:
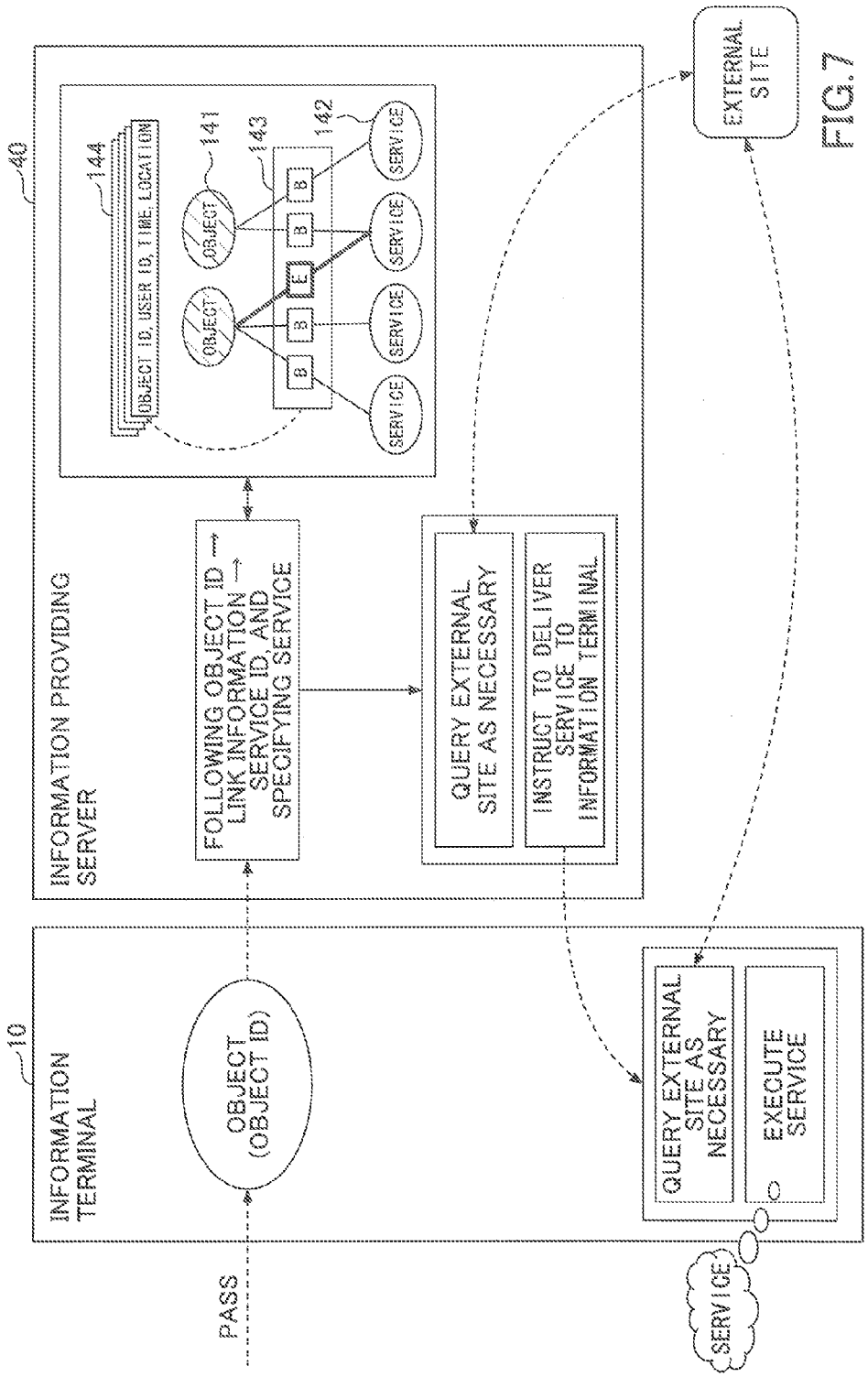
FIG. 7 is a diagram illustrating an example of whole process of information according to the present exemplary embodiment.

An example of the entire flow of the processes of the information providing system 1 according to the present exemplary embodiment will be described referring to FIG. 7. When the information terminal 10 is passed on the object equipped with the wireless communication function (the wireless tag 210a in the belt 200a of the escalator 200, as shown in FIG. 3, for example), the information terminal 10 acquires the object ID from the object equipped with the wireless communication function, and transmits the object ID to the information providing server 40. The information providing server 40, based on the basic link "B" and the extended link "E" in the link information table 143, specifies the service ID, linked with the object ID, and transmits to the information terminal 10 delivery information identified by the specified service ID.

The information providing server 40 may query an external site as necessary, acquire information on the service from the external site, and transmit the acquired information, added to the delivery information, to the information terminal 10.

The information terminal 10 executes the service based on the delivery information transmitted from the information providing server 40. Moreover, the information terminal 10, may query an external site as necessary, acquire information on the service from the external site, and execute the service.

[Process and Flow of Information in Information Providing Server]

Figure 8:
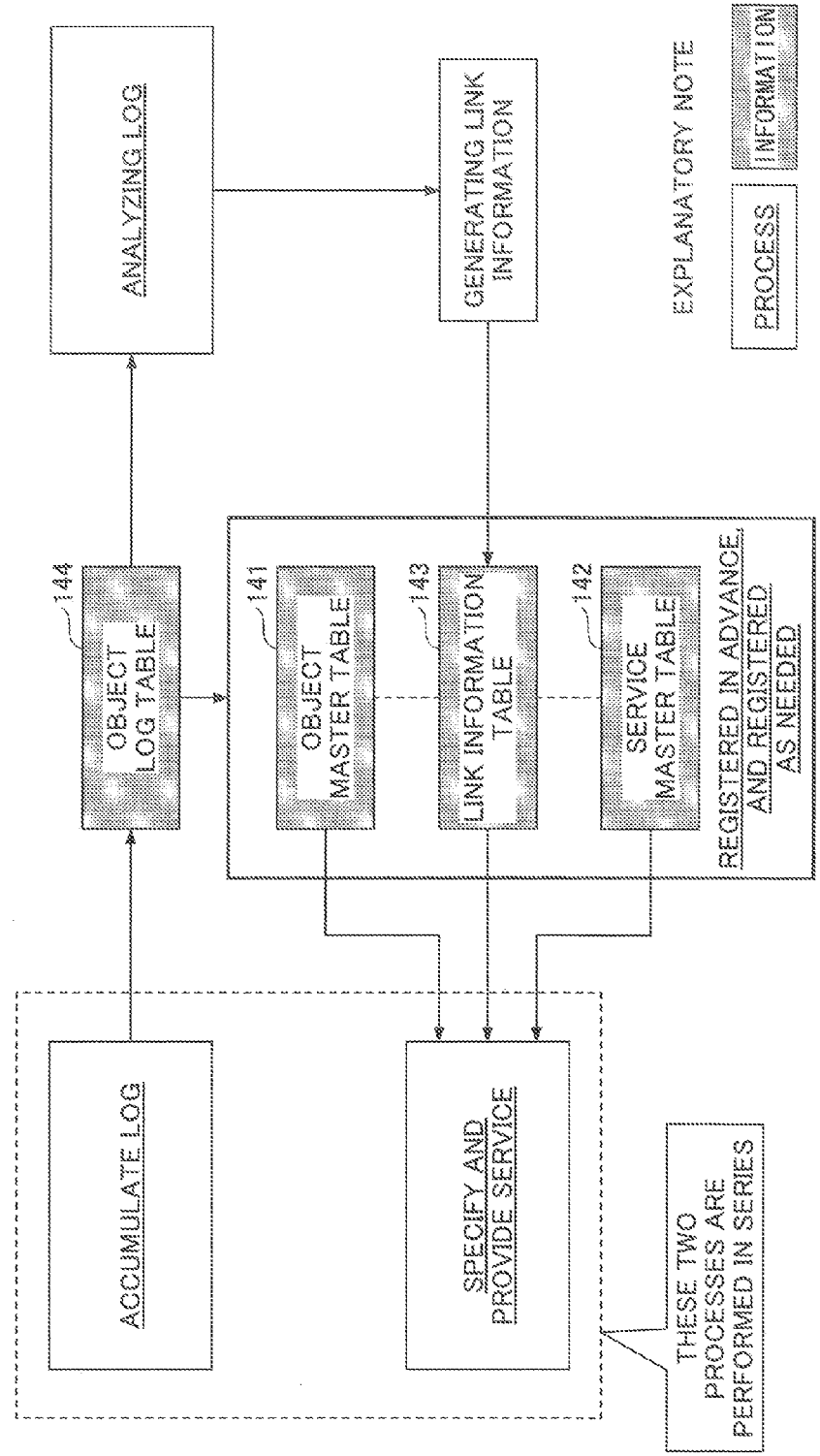
FIG. 8 is a schematic diagram illustrating an example of a process executed in a server according to the present exemplary embodiment.

An example of the flow of information in information providing server 40 according to the present exemplary embodiment will be described referring to FIG. 8.

The information providing server 40 accumulates, as the object log, information, including the object ID, the user ID, the acquiring time, and the GPS information, transmitted from the information terminal 10, in the object log table 144. The object master, the link information, and the service master are preliminarily registered in the object master table 141, the link information table 143 and the service master table 142, respectively. The above information may be registered afterward as needed.

The information providing server 40 searches in the link information table 143, and specifies service ID linked with the acquired object ID. The information providing server 40 sends an instruction to provide the service of the specified service ID to the information terminal 10. According to the above process, in the information providing server 40, accumulating the object log and specifying and providing the service are performed successively.

The information providing server 40 generates, in the case that a new relationship between object ID and service ID can be derived based on the result of analysis of the accumulated object log, an extended link "E". The extended link "E" links the object ID with a service ID different from the service ID linked by the basic link with the same object ID.

[Details of Preliminary Registration]

Next, details of the preliminary registration in each of the tables will be explained with reference to FIGS. 9 and 10. FIG. 9 is a flowchart illustrating an example of the registration process according to the present exemplary embodiment. The registering unit 42 in the information providing server 40 performs a master registration for the object equipped with the wireless communication function (FIG. 9, step S201). According to the master registration, object ID 141a, a name 141b, and location information 141c are preliminarily registered in the object master table. The master registration for the object equipped with the wireless communication function is performed additionally as needed, when a new target appears. For example, the object equipped with the wireless communication function, identified by object ID "100", represents the escalator moving from the ground floor level (1F) to the second floor level (2F) in the building 1.

Next, the registering unit 42 performs a master registration for the service provided by the object equipped with the wireless communication function (FIG. 9, step S202). According to the master registration, a service ID 142a, a service time 142b, a providing service 142c, and extended link target information 142d are preliminarily registered in the service master table 142, as shown in FIG. 10. For example, the service identified by the service ID "S100" represents that the service time period is from September, 2012 to December, 2013, and the provided service is displaying (advertising) an event held on the second floor.

Existing information registered in the service master table 142 may be reused. Moreover, a service master, which will be used, may be registered in advance.

Next, the registering unit 42 registers a relationship between an object and a service as link information (FIG. 9, step S203). According to the registration, an object ID 143$a$, a service ID 143$b$, and a classification 143$c$ are preliminarily registered in the link information table 143, as shown in FIG. 10. The link information preliminarily registered is only basic link "B", as shown in FIG. 10. For example, the basic link "B" links the object ID "100" with the service ID "S100". Accordingly, for example, information on an event held on the second floor of the building is displayed on a display of the information terminals 10, which were passed on the wireless tags 310$a$, 310$b$, in the belt 300$a$, 300$b$ of the escalator 300, moving from the ground floor (1F) to the second floor (2F) of the building 1, or on the signage 400 positioned in the vicinity of the information terminal 10. According to this operation, a user "U", who passed the information terminal 10 on the wireless tags 310$a$, 310$b$ in the belt 300$a$, 300$b$ of the escalator 300 moving from the ground floor (1F) to the second floor (2F) of the building 1, can obtain information related to the event held on the second floor (2F).

Moreover, for example, to the poster with the object ID "300", two service IDs "S102" and "S103" are linked. Then, the provided service further includes putting a poster on a south gate of the park 4, informing readers of the event, from Dec. 20, 2012 to Dec. 25, 2012, and putting a poster informing a readers of a telephone number for reservations from Sep. 1, 2012 to Nov. 30, 2012.

[Accumulating Object Log]

Next, the accumulating object log will be explained with reference to FIGS. 11 and 12. FIG. 11 is a flowchart illustrating an example of a process for accumulating object log information according to the present exemplary embodiment. FIG. 12 is a diagram illustrating an example of the accumulated object log information according to the present exemplary embodiment.

The registering unit 42 of the information providing server 40 receives, from the information terminal 10, an object ID, a user ID, an acquiring time, and GPS position information (FIG. 11, step S301). Next, the registering unit 42 accumulates the received information in the object log table 144 (step S302). According to the above operation, in the object log table 144, as the object log, the object ID 144$a$, the user ID 144$b$, the acquiring time 144$c$, and the GPS position information 144$d$ are accumulated.

[Example of Analysis of Object Log]

Figure 13A:
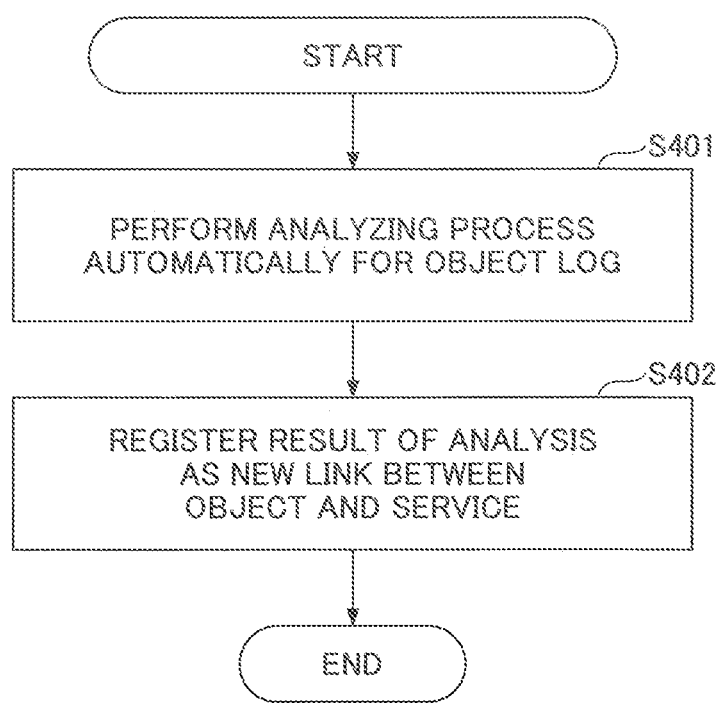
FIGS. 13A and 13B are flowcharts illustrating an example of a process of analyzing the object log according to the present exemplary embodiment.
Figure 13B:
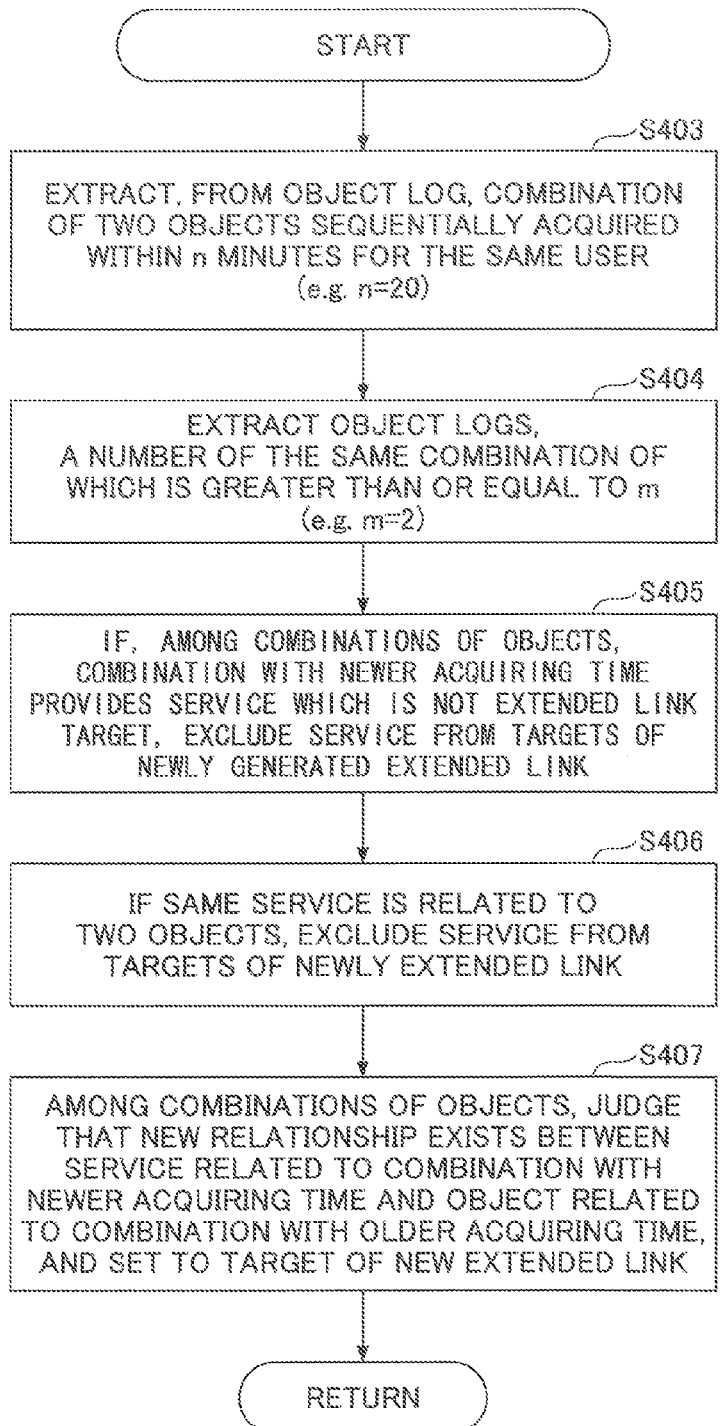
Figure 14:
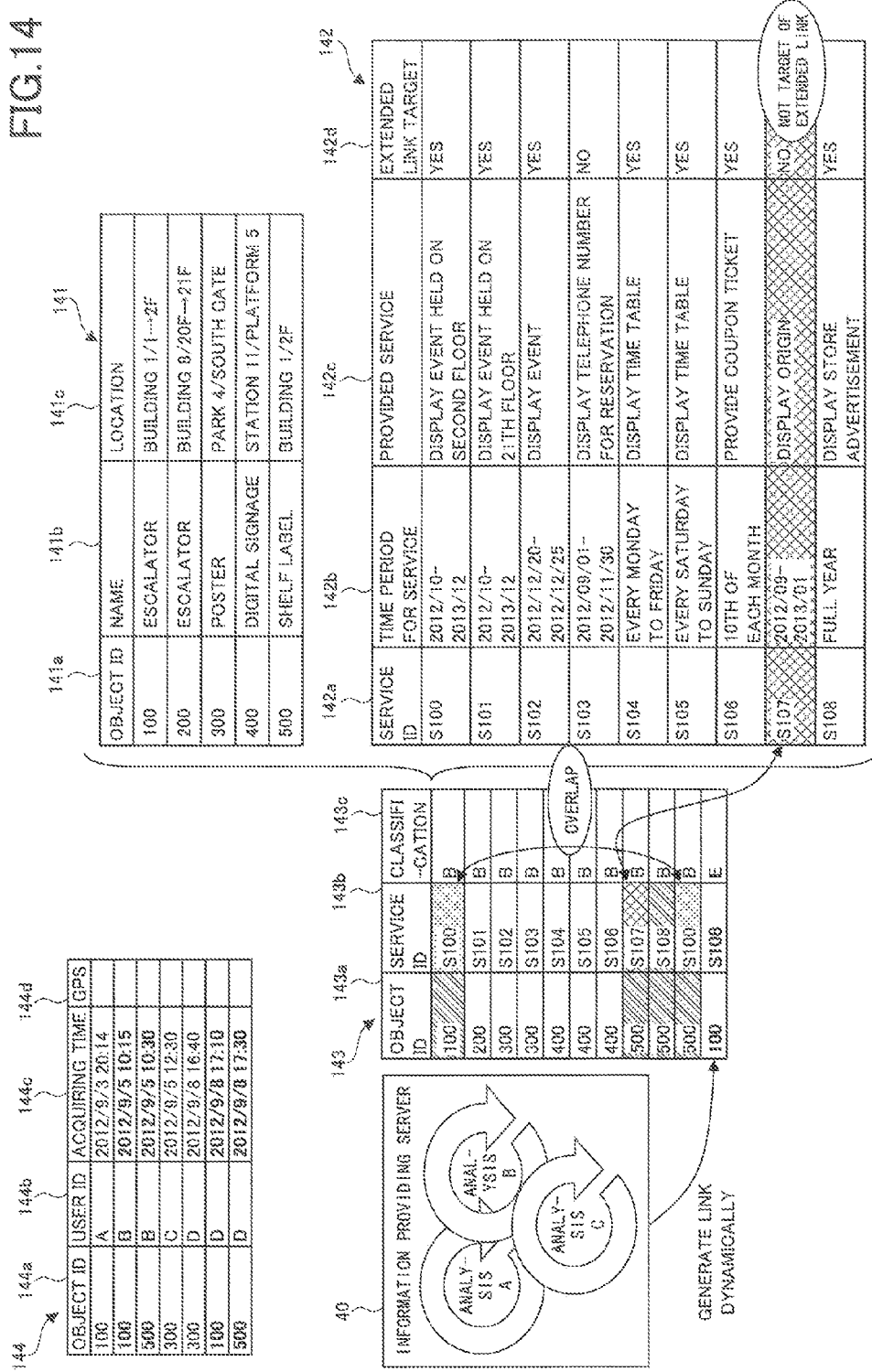
FIG. 14 is a diagram illustrating an example of the process of analyzing the object log according to the present exemplary embodiment.

Next, an example of the analysis of the object log will be explained with reference to FIGS. 13A, 13B and 14. FIGS. 13A and 13B are flowcharts illustrating an example of the process for analyzing the object log according to the present exemplary embodiment. FIG. 14 is an example of a result of the analysis of the object log according to the present exemplary embodiment.

Moreover, the process for analyzing the object log may start at any timing. For a batch process, for example, the timing at which the process for analyzing starts is considered to be a set time to start the batch process. Moreover, the start timing for the analyzing process may be, for example, when a requirement for analyzing the object log is received from the delivery information server 50, or other analyzing terminal. In this case, the delivery information server 50 or other analyzing terminal may specify the service ID, and require analysis of the object log regarding the specified service.

The log analyzing unit 44 of the information providing server 40 performs automatically the analyzing process for the object log (FIG. 13A, step S401). Next, the log analyzing unit 44 generates, in the case that based on the result of the analysis, a new relationship between object ID and service ID can be derived, a new link between the object ID and the service ID, as an extended link, and registers the extended link in the link information table 143 (FIG. 13A, step S402). As an example of the process for analyzing, the log analyzing unit 44, based on the result of analysis for a large number of object logs, extracts a behavior pattern acquired with a high frequency from behaviors of unspecified users. The log analyzing unit 44 generates the extended link "E" so as to provide the service, which can be provided in the extracted behavior pattern, just before the behavior pattern starts or as the behavior pattern starts. The high frequency, mentioned above, represents a state where, for example, a large number of the same pieces of information exist. Moreover, the behavior pattern, mentioned above, represents, for example, a log pattern acquired in a unit of time.

Specifically, for example, according to the result of the analysis, 60 percent of the users, who passed the information terminal 10 on the wireless tag of the escalator, are found to tend to go to a shop "A". The high frequency is not limited to 60 percent, but various criteria for judgment may be employed.

Specific example for the analysis will be explained as follows. The following example for the analysis is illustrative only. The analyzing method is not limited to the following example, but various known techniques for analysis may be used.

An example of the process of analysis according to the present exemplary embodiment is shown in a flowchart of FIG. 13B. The log analyzing unit 44 extracts, from the accumulated object logs, a combination of two objects acquired sequentially within n minutes for the same user (FIG. 13B, step S403). In this example, the time n is assumed to be 20. Specifically, as shown in FIG. 14, object logs with the user ID "B" and the object IDs "100" and "500" are acquired sequentially within 20 minutes. Furthermore, object logs with the user ID "D" and the object IDs "100" and "500" are acquired sequentially within 20 minutes. Accordingly, the log analyzing unit 44, at step S403, extracts the above two combinations.

Next, the log analyzing unit 44, further extracts, from the combinations extracted as above, object logs, a number of the same combination of which is greater than or equal to m (FIG. 13B, step S404). In this example, the number m is assumed to be 2. Specifically, as shown in FIG. 14, two object logs for the users "B" and "D" with the object IDs "100" and "500" are extracted.

The log analyzing unit 44, if, among the combinations of the extracted objects, a combination with a newer acquiring time provides a service which is not the extended link target, the service is excluded from a target for a newly generated extended link (FIG. 13B, step S405). Moreover, in the log analyzing unit 44, in the case that the same service is related to the extracted combination of objects, the service is excluded from a target for newly generated extended link (FIG. 13B, Step S406). The log analyzing unit 44, for the services other than the services excluded at steps S405 and S406, judges that a new relationship exists between the service related to the combination with the newer acquiring time, among the combinations of the extracted objects, and the object related to the combination with the older acquiring time. The log analyzing unit 44 generates a new extended link which links the object related to the older combination with the service related to the new combination (FIG. 13B, step S407).

The processes at steps S405, S406, and S407 will be explained specifically, with reference to FIG. 14. In the example, two combinations, with the object IDs "100" and "500", are extracted. The service related to the newer object with the object ID "500" is related to the object related to the older object with the object ID "100".

According to the process at step S405, if the combination with the newer acquiring time provides a service which is not the extended link target, the service is excluded from a target for a newly generated extended link.

As shown by the link information table 143 in FIG. 14, services related to the object ID "500" with a newer acquiring time, are three services with the service IDs, "S107", "S108" and "S100". Among these services, the service with the service ID "S107" is not the extended link target, as can be seen in the column 142d of the service master table 142, as shown in FIG. 14. Accordingly, the service with the service ID "S107" is excluded from a target for a newly generated extended link.

Furthermore, according to the process at step S406, in the case that the same service is related to the two objects, the service is excluded from a target for a newly generated extended link.

Among the service IDs "S107", "S108" and "S100", the service ID "S100" is related to both of the object IDs "100" and "500". Accordingly, the service with the service ID "S100" is excluded from a target for a newly generated extended link.

For the service ID "S108", which has been judged, at steps S405 and S406, as an extended link target, at the process of step S407, the log analyzing unit 44 judges that a new relationship exists between the service related to the combination with the newer acquiring time, among the combinations of the extracted objects, and the object related to the combination with the older acquiring time, and generates a new extended link "E".

According to the above process, the generating unit 45 generates an extended link, which links the service of the service ID "S108" related to the object of the temporarily new object ID "500" with the service of the temporarily old object ID "100". Consequently, as shown in the bottom row of the link information table 143 in FIG. 14, a new extended link "E" which links the object ID "100" with the service ID "S108" is registered in the link information table 143.

An example of the process of analyzing the object log has been explained as above, but analyzing the object log according to the present invention is not limited to the above example. Various object logs, such as object logs analyzed for other specific use, may be used. Moreover, all the object log analyses do not need to be performed in the information providing server 40 according to the present exemplary embodiment. The information providing server 40 is only necessary to, at least, acquire a result of the object log analysis. Furthermore, the result of the object log analysis does not need to be reflected in the generation of an extended link. The result may be used as information for other uses.

Figure 15:
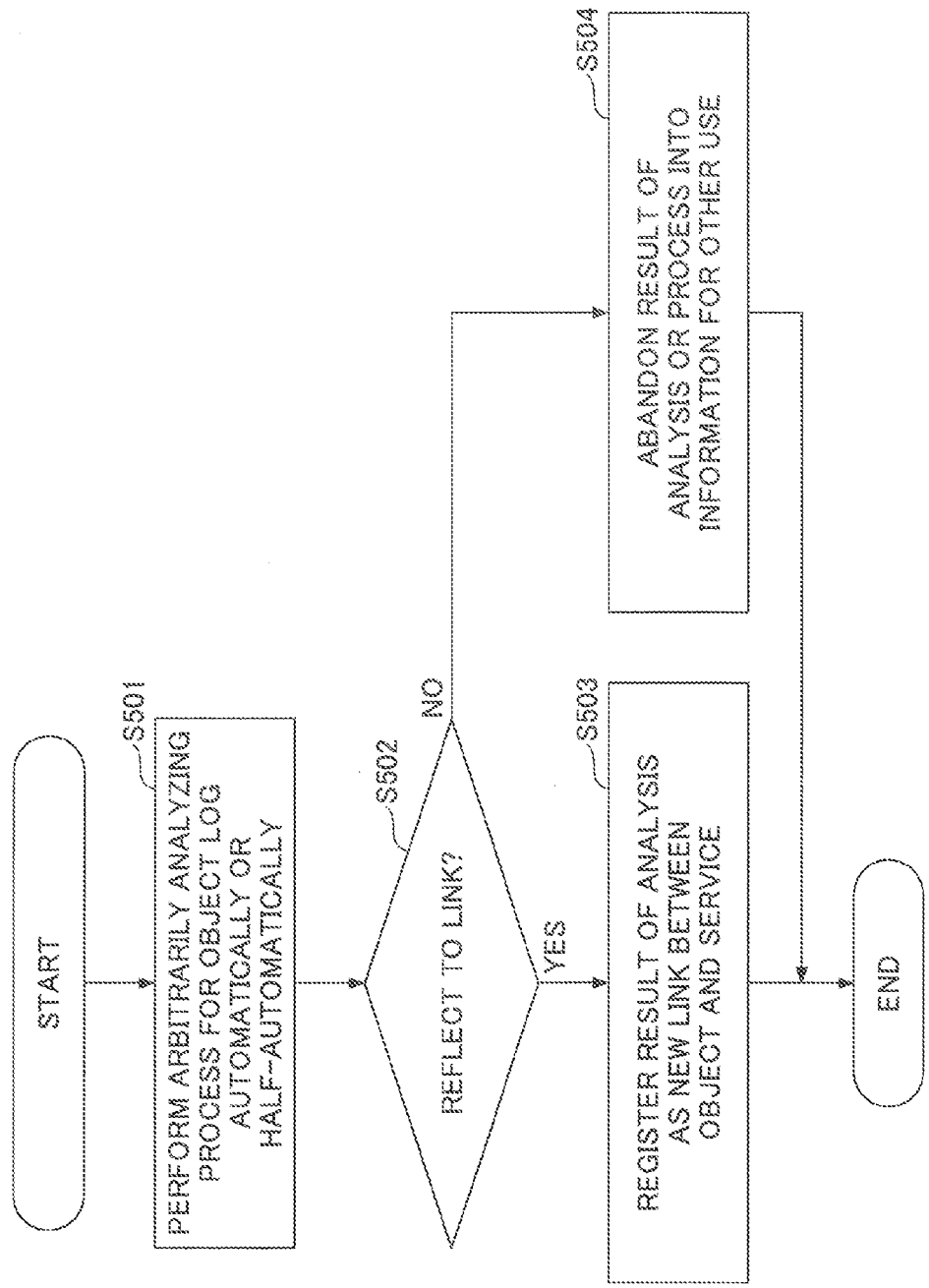
FIG. 15 is a flowchart illustrating another example of the process of analyzing the object log according to the present exemplary embodiment.

For example, in the flowchart of FIG. 15, the log analyzing unit 44 arbitrarily performs the process in the above analyzing method or in another known analyzing method for the object log (step S501). The log analyzing unit 44 inquires of a system administrator or the like whether the result of analysis is to be reflected in the generation of an extended link (step S502). In the case that the result is judged to need to be reflected in the generation of an extended link, based on the result of the object log analysis, an extended link is generated and registered in the link information table 143 as new link information between the object and the service (step S503). In the case that the result is judged not to need to be reflected in the generation of an extended link, the result of the object log analysis is abandoned or processed into information for other use (step S504).

[Service Specifying and Providing Process]

Figure 16:
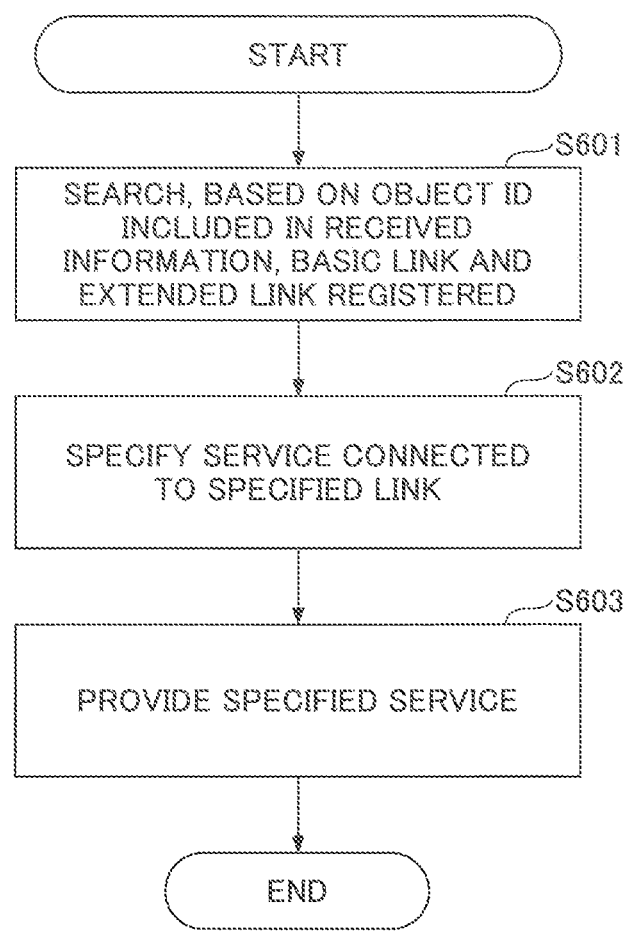
FIG. 16 is a flowchart illustrating an example of a process of specifying and providing service according to the present exemplary embodiment.
Figure 17:
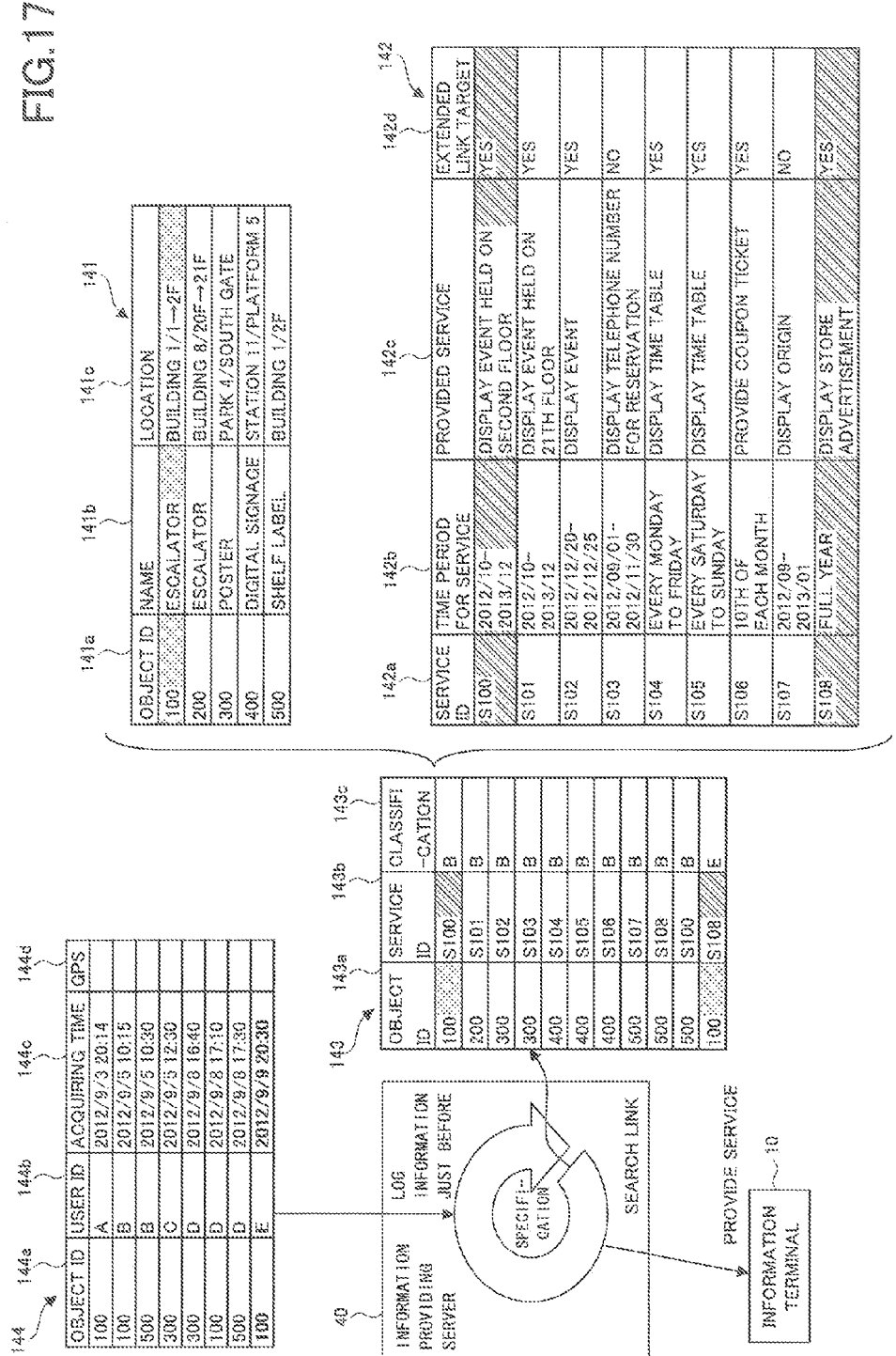
FIG. 17 is a diagram illustrating an example of the process of specifying and providing service according to the present exemplary embodiment.

Next, the process of specifying and providing a service according to the present exemplary embodiment will be explained with reference to FIGS. 16 and 17. FIG. 16 is a flowchart illustrating an example of the process of specifying and providing a service according to the present exemplary embodiment. FIG. 17 is a diagram illustrating an example of the process of specifying and providing a service according to the present exemplary embodiment.

The information providing unit 46 of the information providing server 40, based on object ID included in information received from the information terminal 10, searches a basic link and an extended link registered in the link information table 143 (step S601). Next, the information providing unit 46 specifies a service ID connected to the object ID (step S602). Next, the information providing unit 46 provides a service of the specified service ID (Step S603).

For example, when the user passes the information terminal 10 on the wireless tag 21 in the belt 20a of the escalator 20, the information terminal 10 transmits the object ID "100" of the belt 20a of the escalator 20, the user ID "E", and the acquired time "2012/9/9 20:30" to the information providing server 40. In this case, the information providing server 40 registers the object log (the object ID "100") in the object log table 144, as shown in the bottom row of the link information table 144 in FIG. 17. The information providing unit 46 then searches the link information table 143 in FIG. 17 (step S601), and specifies the service ID "S100" connected by the basic link "B" with the object ID "100" in the received information and the service ID "S108" connected by the extended link "E" with the object ID "100" in the received information (step S602). The information providing unit 46 provides two services identified respectively by the service IDs "S100" and "S108", specified as above. According to the above process, the two services of the service ID "S100" and the service ID "S108", defined in the service master table 142, are provided to the user. That is, on a displaying unit of the information terminal 10 or the signage in the vicinity of the information terminal 10, information on the event held on the second floor (2F) in the same building is displayed. This service is based on the basic link "B" registered previously. In the present exemplary embodiment, in addition to the above service, as a service based on the extended link "E", guidance information on a specific shop is displayed on the displaying unit of the information terminal 10 the user carries, or on the signage in the vicinity of the information terminal 10.

The information providing system 1, explained as above, based on the link information between an object and a service (the previously registered basic link "B"), can provide a service taking account of a relationship between an object and a service within a human-predictable range. Additionally, the information providing system 1 according to the present exemplary embodiment accumulates traffic lines of plural users as an object log, analyzes the accumulated object log information, and generates link information between the object and the service (extended link "E"). The service linked by the extended link "E" with the object is provided. According to the above process, the information providing system 1 according to the present exemplary embodiment can provide a service taking account of a relationship between an object and the service beyond the human-predictable range, which has been previously registered.

An example specifically illustrating a relationship between a service and an object beyond the human-predictable range, previously registered, will be described in the following. Consider that more than half of users who have passed the information terminals 10 on the escalator are found to tend to go to a shop "A", by analyzing the object log accumulated in the object log table 144. In this case, a new extended link for providing a service related to the shop A is automatically generated, connected to the object of the escalator. In this way, the information providing system 1 according to the present exemplary embodiment, while providing the service based on the basic link in the range, where the relationship is previously human-predictable, traffic lines of users, to whom the service is provided, are acquired and accumulated as the object logs. Then, for example, the information providing system finds, based on the object log, a new trend of relationship from behaviors of more than half of the users from the object log, and generates automatically the new relationship as an extended link. Accordingly, a new service beyond the human-predictable range can be provided to the users.

Although, the information providing system, the information terminal and the information providing server according to the present invention have been explained with reference to the attached drawings, as above, the present invention is not limited to this embodiment. A person skilled in the art of the field of the present invention may contemplate various variations and modifications from the scope of the invention as set forth in the accompanying claims. The variations and modifications belong to the technical field of the present invention. Furthermore, plural variations of modifications may be combined, unless they are inconsistent with each other.

For example, in the above exemplary embodiment, the plural information terminals, having entered the first region where the communication with the object equipped with a wireless communication function is possible, acquire the identification information of the object equipped with a wireless communication function, and transmit the acquired identification information with the identification information of the respective information terminals and the attribute information of the respective users to the information providing server. The transmitted information is used for the generation of the second link information. However, the present invention is not limited to this; the second link information may be generated based on, at least, identification information of plural objects equipped with wireless communication functions, transmitted from plural information terminals, which enter a second region where communications with the plural objects equipped with wireless communication functions are possible, and the identification information of the plural information terminals. Accordingly, the object log can be analyzed based on the traffic line of the user, who has passed at least two access points (objects equipped with a wireless communication function), and the link information is generated based on the result of the analysis. The generated link information may be set as the second link information, or may be set as third link information, discriminated from the second link information, and registered in the link information table 143. For example, the information terminal may wirelessly communicate with the wireless tag in the escalator from the ground floor (1F) to the second floor (2F), and then the information terminal may wirelessly communicate with the wireless tag in the escalator from the second floor (2F) to the third floor (3F). According to the above process, a service based on an inclination of the continuous traffic lines of the user can be provided. Meanwhile, the second region is larger than or the same as the first region.

The tables, which the information providing server 40 is equipped with, may be provided inside the information providing server 40, or may be provided outside the information providing server 40. Moreover, the information providing system 1 may include plural information providing servers 40, and any information providing server of the plural information providing servers may be equipped with the functions according to the present exemplary embodiment. Furthermore, the configuration of the system in which the information terminal and the information providing server are connected, explained in the present exemplary embodiment, is an example, and various variations and modifications for the configuration of the system may be made according to a use or a purpose.

Moreover, each of the information providing server 40 and the information terminal 10 includes a CPU (Central Processing Unit), which is not shown. A program, which is executed by the CPU to realize each of the functions, may be stored in advance in a storing unit (not shown), such as a ROM (Read-Only Memory), and a HDD (Hard Disk Drive), provided in a computer (not shown). The program may be stored in a recording medium, such as a CD-ROM (Compact Disk Read-Only Memory), and a non-volatile recording medium (memory), such as an SRAM (Static Random Access Memory), an EEPROM (Electrically Erasable Programmable Read-Only Memory), and a memory card. The functions of the information providing system according to the present invention may be realized by the CPU executing the program stored in the above-described memory. Furthermore, the program may be downloaded from an external device, equipped with a recording medium storing the program, or from an external device, a storing unit of which stores the program.

The present application is based on and claims the benefit of priority of Japanese Priority Application No. 2012-288464 filed on Dec. 28, 2012, with the Japanese Patent Office, the entire contents of which are hereby incorporated by reference.

DESCRIPTION OF THE REFERENCE NUMERALS 1 information providing system
10 information terminal
20 escalator
21 wireless tag
30 network
40 information providing server
41 communication unit
42 registering unit
43 log accumulating unit
44 log analyzing unit
45 generating unit
46 information providing unit
50 delivery information server
141 object master table
142 service master table
143 link information table
144 object log table

The invention claimed is:

1. An information providing system, which provides delivery information to an information terminal which has communicated with a particular object that is equipped with a wireless communication function, comprising:
   a registering unit that registers, prior to providing said delivery information to the information terminal, first link information which associates identification information of the object equipped with the wireless communication function to service information corresponding to a service provided by or at the object, the registering unit additionally registering plural timestamps indicating when each of plural information terminals has communicated with a registered object;
   a generating unit that generates second link information which specifies particular delivery information to be transmitted to the information terminal, determined based on behavioral trends of plural information terminals which have communicated with the particular object, said behavioral trends having been determined from (i) the first link information and (ii) identification information obtained from the plural information terminals which have communicated with the particular object, the second link information establishing an association which was not previously registered in the registering unit between the identification of the object equipped with the wireless communication function information and service information;
   an analyzing unit that obtains the plural timestamps registered by the registering unit, and causes the generating unit to generate the second link information when the analyzing unit determines, based on the plural timestamps indicating when each of the plural information terminals has communicated with a registered object, that a predetermined number of the plural information terminals that have communicated with a registered object have each communicated with a particular sequence of a plurality of objects equipped with the wireless communication function within a predetermined time period; and
   an information providing unit that delivers the particular delivery information to the information terminal.

2. The information providing system, as claimed in claim 1, wherein one or more information terminals enter in a first region, and one or more information terminals enter in a second region.

3. The information providing system, as claimed in claim 1, wherein the behavioral trends are determined based on when the plural information terminals which have communicated with the particular object are within communication range of the object equipped with the wireless communication function, so that the delivery information is delivered, and acquire the identification information of the object equipped with the wireless communication function.

4. The information providing system, as claimed in claim 1, wherein the generating unit generates the second link information based on at least the identification information of the plurality of objects equipped with wireless communication function and the identification information of the plural information terminals which have communicated with the particular object, transmitted from the plural information terminals which have communicated with the particular object, which enter a second region where communication with the plurality of objects equipped with wireless communication function is possible.

5. The information providing system, as claimed in claim 1, wherein the generating unit generates the second link information based on the identification information of the object equipped with the wireless communication function, the identification information of the plural information terminals which have communicated with the particular object, and attribute information of the plural information terminals which have communicated with the particular object.

6. The information providing system, as claimed in claim 1, further comprising:
   a log accumulating unit configured to accumulate at least the identification information of the object equipped with the wireless communication function and the identification information of the plural information terminals which have communicated with the particular object, acquired by the communication with the plural information terminals which have communicated with the particular object, wherein the registering unit updates the second link information based on the information accumulated by the log accumulating unit.

7. The information providing system, as claimed in claim 6, wherein the registering unit updates the second link information or changes the second link information to the first link information, according to a status of a delivery of the delivery information linked by the second link information.

8. The information providing system, as claimed in claim 1, wherein the information providing unit provides the second link information to a delivery information server, which supplies a piece of the delivery information or a plurality of pieces of the delivery information.

9. The information providing system according to claim 1, wherein the analyzing unit analyzes data registered by the registering unit, and when the analyzing unit determines that a new relationship exists between a first registered object associated with delivery information corresponding to a relatively older timestamp and a different second registered object associated with delivery information corresponding to a relatively newer timestamp, the analyzing unit generates an extended link that links the delivery information associated with the second registered object and corresponding to the newer timestamp to the delivery information associated with the first registered object and corresponding to the older timestamp.

10. An information providing server, which provides delivery information to an information terminal which has communicated with a particular object that is equipped with a wireless communication function, comprising:
   a registering unit that registers, prior to providing said delivery information to the information terminal, first link information which associates identification information of the object equipped with the wireless communication function to service information corresponding to a service provided by or at the object, the registering unit additionally registering plural timestamps indicating when each of plural information terminals has communicated with a registered object;
   a generating unit that generates second link information which specifies particular delivery information to be transmitted to the information terminal, determined based on behavioral trends of plural information terminals which have communicated with the particular object, said behavioral trends having been determined from (i) the first link information and (ii) identification information obtained, the second link information from the plural information terminals which have communicated with the particular object establishing an association which was not previously registered in the registering unit between the identification of the object equipped with the wireless communication function information and service information;

an analyzing unit that obtains the plural timestamps registered by the registering unit, and causes the generating unit to generate second link information when the analyzing unit determines based on the plural timestamps indicating when each of the plural information terminals has communicated with a registered object, that a predetermined number of the plural information terminals that have communicated with a registered object have each communicated with a particular sequence of a plurality of objects equipped with the wireless communication function within a predetermined time period; and an information providing unit that delivers the particular delivery information to the information terminal.

* * * * *